June 9, 1959    T. J. JOHNSON    2,889,635
ARTIFICIAL AIRCRAFT SIMULATOR FOR RADAR SYSTEMS
Filed March 11, 1954    10 Sheets-Sheet 1

THOMAS J. JOHNSON,
INVENTOR.

BY
Barbalew + Scantlebury
ATTORNEYS.

June 9, 1959

T. J. JOHNSON 2,889,635

ARTIFICIAL AIRCRAFT SIMULATOR FOR RADAR SYSTEMS

Filed March 11, 1954

THOMAS J. JOHNSON,
INVENTOR.

BY
Barker & Scantlebury
ATTORNEYS.

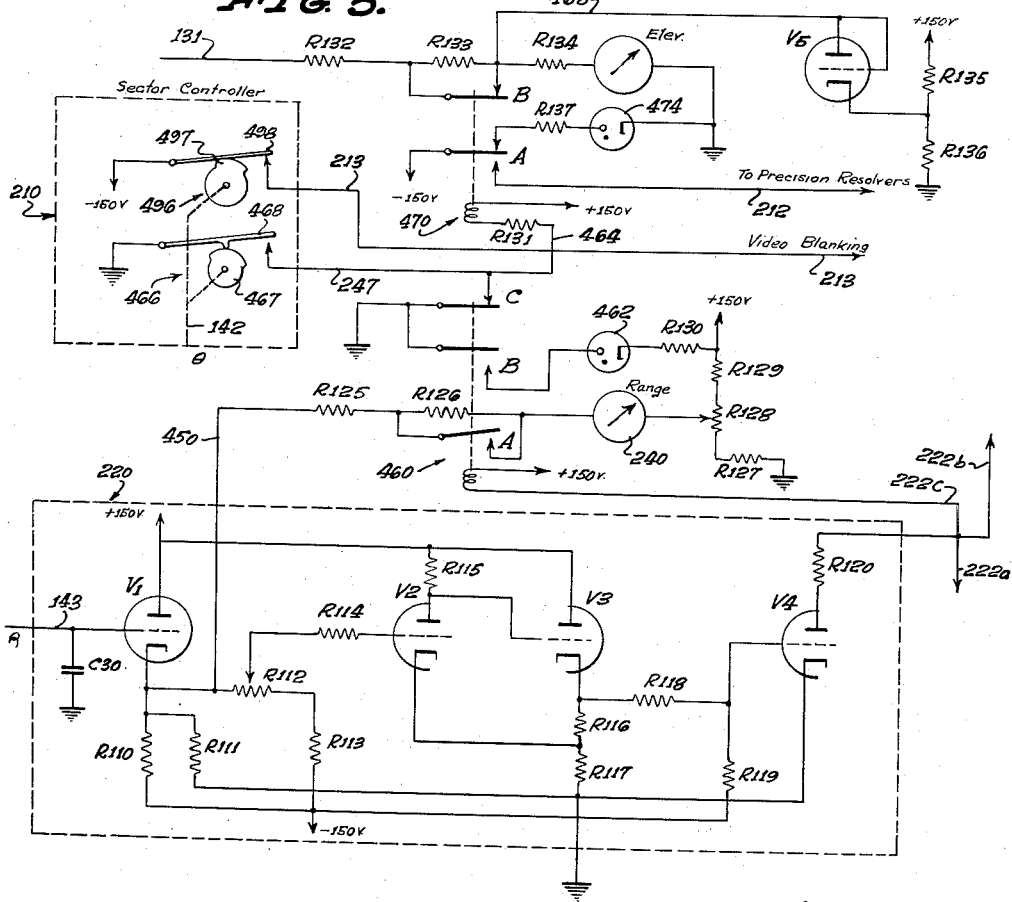

June 9, 1959 T. J. JOHNSON 2,889,635
ARTIFICIAL AIRCRAFT SIMULATOR FOR RADAR SYSTEMS
Filed March 11, 1954 10 Sheets-Sheet 5

THOMAS J. JOHNSON,
INVENTOR.

BY Barbelew & Seantlebury
ATTORNEYS.

June 9, 1959 T. J. JOHNSON 2,889,635
ARTIFICIAL AIRCRAFT SIMULATOR FOR RADAR SYSTEMS
Filed March 11, 1954 10 Sheets-Sheet 6

THOMAS J. JOHNSON,
INVENTOR.
BY
Barlow & Scantlebury
ATTORNEYS.

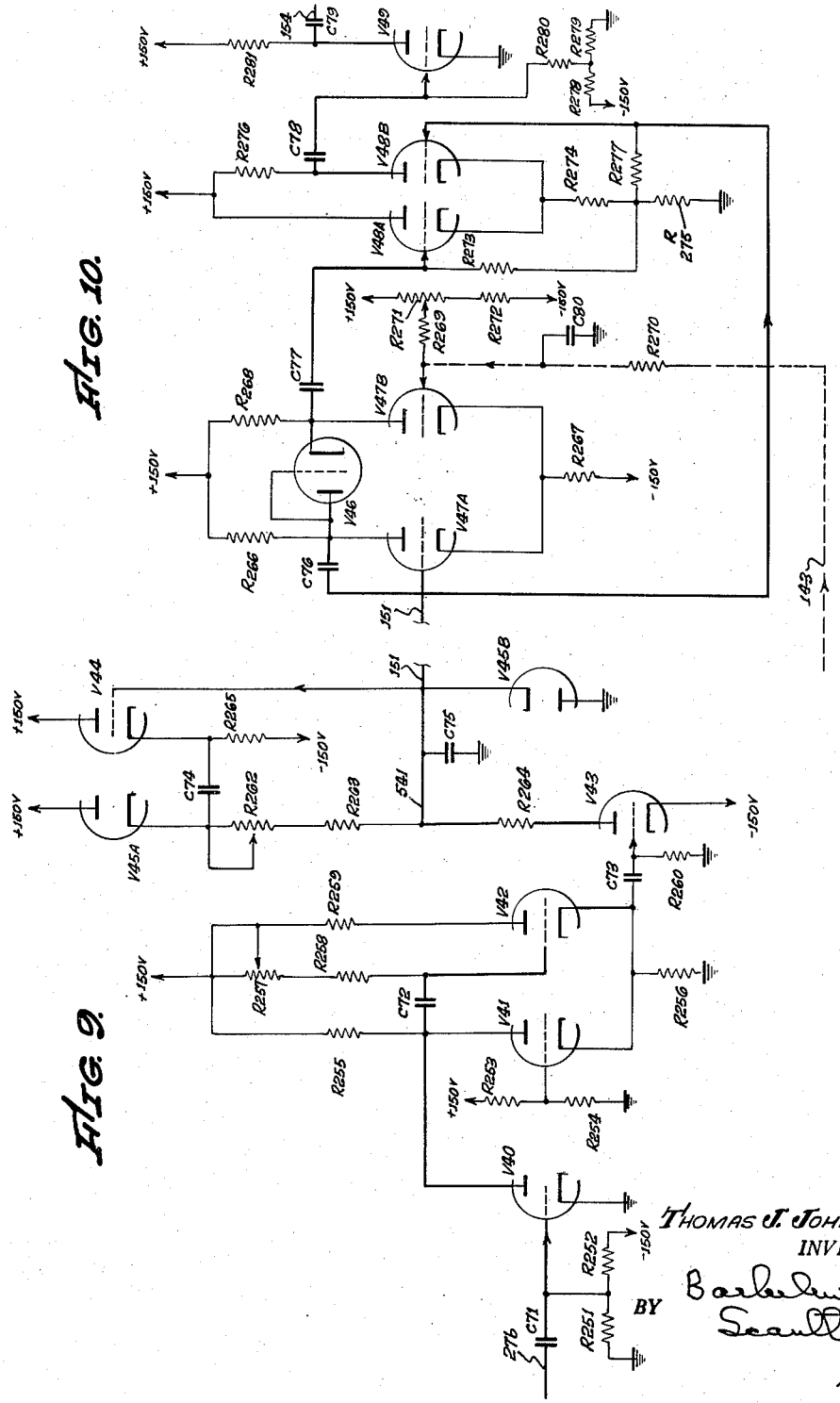

THOMAS J. JOHNSON,
INVENTOR.

BY
Barkelew + Scantlebury
ATTORNEYS.

June 9, 1959

T. J. JOHNSON 2,889,635

ARTIFICIAL AIRCRAFT SIMULATOR FOR RADAR SYSTEMS

Filed March 11, 1954

THOMAS J. JOHNSON,
INVENTOR.

BY Barbelew &
Scantlebury
ATTORNEYS.

United States Patent Office 2,889,635
Patented June 9, 1959

2,889,635
ARTIFICIAL AIRCRAFT SIMULATOR FOR RADAR SYSTEMS

Thomas J. Johnson, Los Angeles, Calif., assignor to Gilfillan Bros., Inc., Los Angeles, Calif., a corporation of California Application March 11, 1954, Serial No. 415,545

30 Claims. (Cl. 35—10.4)

This invention has to do with means for displaying on an indicator screen of a radar system a realistic representation of an artificial aircraft. Such a representation is useful for training operators, for maintaining operators at peak efficiency in handling specialized problems, for checking and adjusting operation of the system, and for other purposes.

More particularly, the invention has to do with means for causing a representation of an artificial aircraft to move over the radar indicator screen in a pattern of movement that duplicates with relatively great fidelity the movement that would result from flight of a real aircraft in a definite and preferably directly controllable manner.

The invention further permits convenient and accurate control of the course flown by the artificial aircraft, that control being preferably carried out in terms of the same variables that primarily determine the flight of a real aircraft. In preferred form, that control may be carried out in terms of speed, rate of turn and rate of climb. In accordance with one aspect of the invention, each of those variables is subject to independent manual control, and the representation of the artificial aircraft is caused to move on the screen in close correspondence to the instant values of those variables.

An artificial aircraft simulator in accordance with the invention may be a self-sufficient system having its own display system, which is preferably of the type utilized in conventional radar systems; or the aircraft simulator may be used in conjunction with, or may form a part of, many different types of radar systems, utilizing the same indicator system on which the regular radar information is displayed. For purposes of illustration, the invention will be described with particular reference to a radar system of the type that is normally employed for guiding from the ground the approach of an aircraft to a landing field. Ground controlled approach (GCA) systems of known type typically comprise a search system, which produces a plan position indication (PPI) of the aircraft in the vicinity of the landing field, and a precision system, which produces both an expanded plan position indication (EPI) of the aircraft within a limited range of azimuth that includes the glide path to the landing strip and an expanded elevation indication covering the same region. A considerable variety of detailed instrumentation is therefore required to produce complete representations of an artificial aircraft in all three of those indicator showings. From the following description of such instrumentation it will be obvious to those skilled in the art how the invention may be similarly carried out in connection with other known types of radar system.

An important feature of an aircraft simulator in accordance with a preferred form of the invention concerns the order in which certain steps of the required computations are performed. Thus it is preferred, for example, to derive signals representing respective components of the aircraft speed in three cartesian coordinates; then by integration of those respective speed signals to develop corresponding signals representing the aircraft position in cartesian coordinates with respect to the normal zero of the radar system; and then under control of those cartesian position signals to derive the necessary representation of the aircraft position in coordinates corresponding to the radar indicator display or displays. The latter variables are typically polar coordinates with respect to the radar zero, and will be taken for illustration as range, azimuth angle and elevation angle.

The invention further provides particularly effective and economical means for deriving signals representing range and azimuth angle from cartesian position coordinate signals, for example for use in representing an artificial aircraft in a PPI display. The invention also provides means for accomplishing that same type of derivation in a distinctive manner that combines economy of instrumentation and relative accuracy of performance within the limited angular range of azimuth and elevation typically required by the precision system of a GCA radar system.

A further object of the invention is the provision of convenient means for accelerating the movement of the artificial aircraft, for example for the purpose of shifting it rapidly to a desired initial position from which to resume normal (realistic) operation. The invention further permits the aircraft to be conveniently arrested at any desired point in its "flight" without disturbing the regular flight controls; and then to be caused to resume flight in accordance with the said controls.

The invention further provides means for controlling the precision display of an artificial aircraft in accordance with its position in the search display. In particular, the precision display is preferably blanked and the precision computing mechanism rendered partially inoperative when the artificial aircraft is outside of the area covered by the precision display. The invention further provides means for modifying the operation of certain portions of the computing system in accordance with aircraft position. For example, the invention may provide means for varying the sensitivity of response of the computer that derives polar position signals from cartesian signals, increasing that sensitivity in response to decrease of the aircraft range.

The invention further may provide direct-reading meters that indicate continuously the respective values of certain variables, such as heading, bearing, range and elevation, for example, independently of the indications on the regular radar displays. Such supplementary information may be helpful in interpreting the displays as well as in checking their accuracy. Means may be provided for automatically varying the sensitivity of such meters in accordance with aircraft position and for indicating clearly which range of sensitivity is effective at any time.

The invention further provides effective means for simulating in the radar displays the variations of signal intensity normally caused by fading of the radar signal and similar effects, commonly referred to collectively as low frequency noise. Simulation of such noise is typically accomplished by modulation of the video output of the simulator system in accordance with a specially generated low frequency noise signal. Such a signal may be generated, for example, by a low frequency noise generator of the type described and claimed by Lawrence Michels in the copending patent application, Serial No. 414,609, filed March 8, 1954, now Patent No. 2,753,453 under the title "Low Frequency Noise Generator" and assigned to the same assignee as the present application.

A full understanding of the invention and of its further objects and advantages will be had from the following description of certain illustrative embodiments, of which description the accompanying drawings form a part. It will be understood that the particulars of the described structure and arrangement, both as to the present invention and as to the radar systems that provide the environment for its presentation, are intended merely as illustration, and that many changes may be made therein without departing from the scope of the invention, which is defined in the appended claims.

In the drawings:

Fig. 4 is a diagram illustrating typical relationships between cartesian and polar coordinates;

Fig. 5 is a schematic diagram representing illustrative means for providing controls responsive to range and azimuth angle;

Fig. 5A is a schematic diagram corresponding to a portion of Fig. 5 and representing a modification;

Fig. 9 is a schematic diagram representing illustrative means for developing a sawtooth timing wave;

Fig. 10 is a schematic diagram representing illustrative means for developing a range gate;

Fig. 15 is a schematic diagram representing a further modification.

Figure 1:
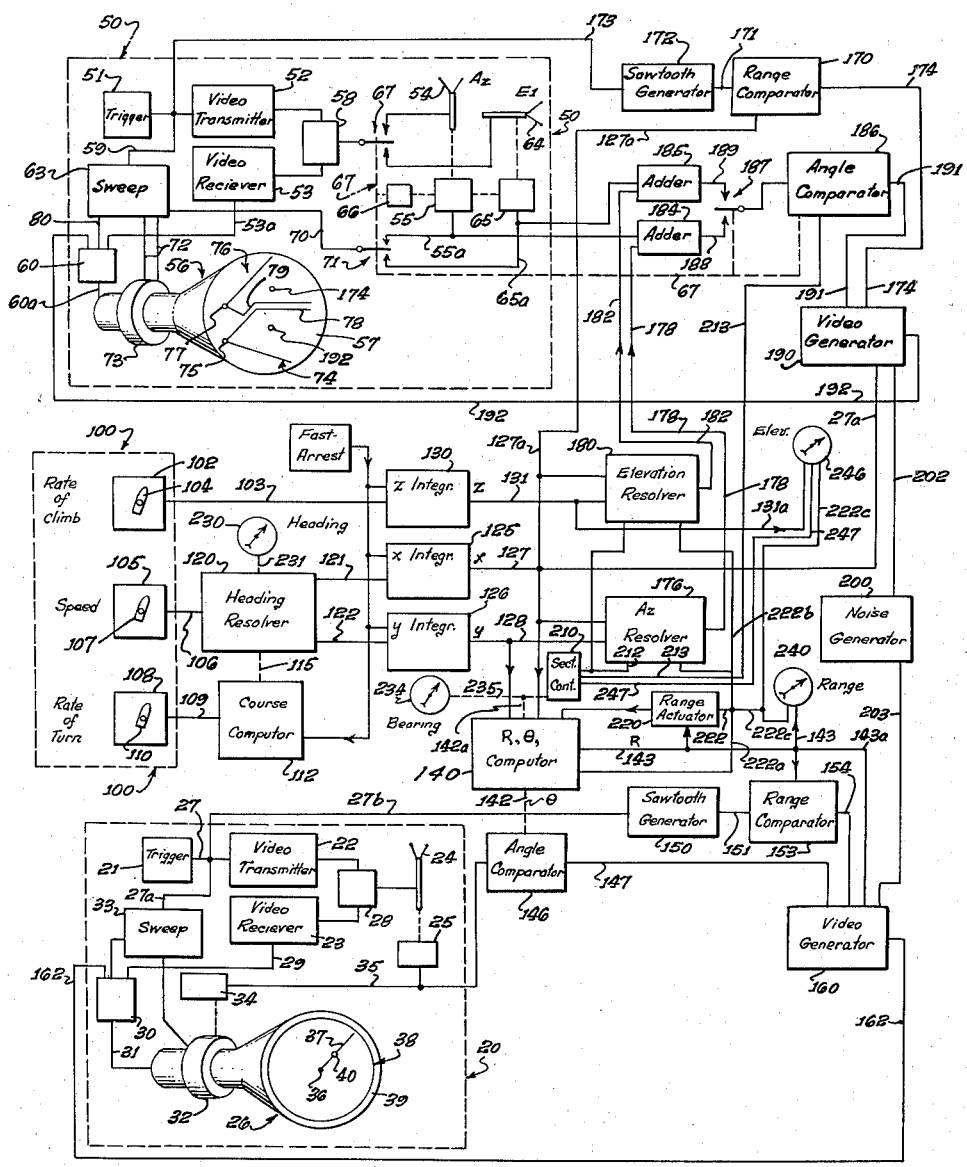
Fig. 1 is a schematic diagram representing an illustrative embodiment of the invention.

Referring particularly to Fig. 1, a typical search radar system is indicated in simplified block form at 20 and a typical precision radar system is similarly indicated at 50.

As illustratively shown, search system 20 comprises a timing means 21 which develops one or more periodic timing signals; a video transmitter 22 and a video receiver 23; an antenna 24 which is driven in periodic scansion movement by scansion drive means indicated at 25; and a cathode ray indicator tube 26. Video transmitter 22 receives periodic trigger pulses from timing means 21 via line 27 and produces a pulse of radio frequency energy in timed relation to each trigger. Those pulses are transmitted to antenna 24 via a transmit-receive duplexing device indicated at 28, and are radiated by the antenna as a directed radar beam, the azimuth of that beam varying periodically under control of scansion drive 25. Radio frequency energy reflected by a target within that beam is received by the antenna and transmitted via duplexer 28 to video receiver 23, by which it is amplified, detected and supplied as a video signal over line 29. That video signal is transmitted to tube 26 via mixer 30, in which it may be combined in known manner with other signals, produced by means not explicitly shown, which may represent range marks, map designations and other desired information. The resulting combined video signal is supplied via line 31 to a suitable electrode of cathode ray tube 26 in a manner to modulate the intensity of the cathode ray beam. That beam is caused to sweep across the tube screen 39 in a succession of sweep paths from a fixed zero 36. A typical sweep path is indicated at 37. Means are provided in known manner to cause the direction of that sweep path to rotate about zero 36 in direct correspondence to the scansion movement of the radar beam, typically producing a circular display, indicated at 38.

For example, a magnetic deflection yoke 32 may receive uniform periodic sweep current pulses of suitable form from sweep generating means 33, which acts to produce a sweep pulse in response to each trigger pulse received over line 27a from timing means 21; and yoke 32 may be mechanically driven in rotation about the axis of tube 26 by drive means indicated at 34, that drive means being controlled by a suitable angle signal which is received over line 35 from antenna drive means 25. That angle signal, which may typically comprise the output from a selsyn generator driven with antenna 24, continuously represents the azimuth angle of the radiated beam from antenna 24, and controls the position of yoke 32 in such a way that the direction of deflection of the cathode ray beam in its successive sweep movements on the tube screen continuously corresponds to that azimuth angle. Intensification of the cathode beam by the video signal resulting from a target echo therefore produces a visible indication on screen 39 in an azimuth sector of the screen that corresponds to the actual azimuth angle of the target with respect to antenna 24. And the radial position of that indication is determined by the distance moved by the beam along the sweep during the travel time of the radar pulse to and from the target, and represents the actual target range.

Precision radar system 50 is preferably, although not necessarily, of the type in which both the azimuth and the elevation displays appear on the screen of a single cathode ray indicator tube. That system may, for example, be of the type described and claimed in United States Patent 2,649,581 issued on August 18, 1953 to Homer G. Tasker, et al., and assigned to the assignee of the present application. Such a system, as here illustratively shown in simplified schematic form, includes a timing means 51 and video transmitting means 52 that develops radio frequency energy pulses in timed relation to trigger pulses generated by the timing means. Those energy pulses are transmitted via duplexer 58 to the radio frequency switch 69, which delivers the pulses selectively either to the azimuth antenna 54 or to the elevation antenna 64, depending upon the switch position. Antennas 54 and 64 are driven in scansion in azimuth and in elevation, respectively, by respective drive mechanisms represented at 55 and 65, both those drive mechanisms being driven in timed relation as by the common power means 66. That drive is preferably such that the antennas perform alternate scansion movements in their respective coordinates. A synchronized control, indicated by the dashed lines 67, which may, for example, include a relay type of control, causes switch 69 (and also other switches to be described) to operate periodically in timed relation to the scansion movements of the antennas. That relation is such that the radio frequency pulses from duplexer 58 are delivered to azimuth antenna 54 during the period of its scansion; and are delivered to elevation antenna 64 during its period of scansion. A target in the resulting beam from either antenna may return a reflected radiation pulse to that antenna, which is then transmitted via radio frequency switch 69 and duplexer 58 to the video receiver 53. A video signal is thereby produced in known manner on line 53a, mixed with other desired signals in mixer 60, and applied via line 60a to a suitable electrode of the cathode ray indicator tube 56 to modulate the intensity of its cathode ray.

The position of the cathode ray beam on the screen 57 of tube 56 may be controlled by sweep circuitry, which is indicated schematically at 63 and which develops suitable deflection currents for delivery via lines 72 to fixed deflection coils 73.

Details of sweep circuitry 63, which do not form a part of the present invention, are illustratively described in the above identified patent. Sweep circuitry 63 acts under control of periodic timing pulses received via line 59 and of antenna position signals received via line 70. The latter signals, which may typically comprise voltages proportional to the sines of the respective scansion angles, are developed for the azimuth antenna by control mechanism 55 and for the elevation antenna by control mechanism 65, and are supplied on lines 55a and 65a, respectively. One or other of those signals is selected by switch 71, which is driven via control 67 from antenna drive means 66 in timed relation to switch 69 and to the antenna scan drives. Switch 71 is so controlled that it delivers to line 70 the azimuth antenna position signal during azimuth scansion and delivers the elevation antenna position signal during elevation scansion.

Sweep circuitry 63 acts in response to those signals to produce an azimuth display 74 with zero at 75 during azimuth scansion; and to produce an elevation display 76 with zero at 77 during elevation scansion. In each display the sweep paths of the cathode ray beam are outward from the zero at an angle that corresponds at an enlarged scale to the scansion angle of the radiated beam. The two displays are limited in their extent, by means of a signal developed in sweep circuitry 63 and delivered, for example, to mixer 60 via line 80. That signal blanks the cathode ray beam at the lines 78 and 79 of the respective displays, thereby preventing them from overlapping.

With specific reference to the typical search and precision radar systems represented at 20 and 50, a primary purpose of the present invention is the provision of means acting to produce in search display 38 and in precision azimuth display 74 and elevation display 76, preferably in combination with the information normally present in those displays, visual indication of the position of an artificial aircraft that is readily controllable, for example manually, as to its flight in a manner closely corresponding to normal control of an actual aircraft.

It will be understood that an aircraft simulator in accordance with the present invention may, and preferably does, include means for displaying and controlling more than one artificial aircraft. For that purpose all of the mechanism to be described may be duplicated to whatever extent is required, the video output from each such channel then representing an individual, independently controllable artificial aicraft. Those video outputs may be mixed in any suitable manner for supply to the radar display system. For purposes of illustration, a single channel will be shown and described.

A control unit is indicated at 100, comprising separately operable devices for producing manually controllable signals that represent the respective flight characteristics selected for control of the artificial aircraft. In the present embodiment a rate-of-climb control 102 produces over line 103 an electrical signal that represents the rate of climb of the artificial aircraft and is variable by manipulation of knob 104; a speed control 105 produces over line 106 an electrical signal that represents the speed of the aircraft in the direction of its heading and that is variable by manipulation of knob 107; and a rate-of-turn control 108 produces over line 109 an electrical signal that represents the rate of change of the direction of flight of the artificial aircraft, measured in a horizontal plane, that signal being variable by manipulation of knob 110. The system as a whole acts under control of those three signals to produce search and precision video signals that are supplied via lines 162 and 192 to the respective radar systems 20 and 50 and that may be combined in mixers 30 and 60 with the respective video information of those systems to produce modulation of the intensity of the cathode ray beams in the indicator tubes of those systems. Those video signals, being produced under control of the three control signals in a manner to be described, produce on their respective indicator screens cathode ray beam indications that represent the position that an actual aircraft would have if flying under the same conditions of rate of climb, speed and rate of turn, for example, that are represented by the signals on lines 103, 106 and 109, respectively.

The rate-of-turn signal on line 109 is supplied to a course computer, indicated schematically at 112. As illustratively shown, and as will be described in illustrative form (Fig. 2), course computer 112 comprises means for driving a heading shaft 115 at a rate of revolution that is directly equal in magnitude, and corresponds in direction, to the rate of change of the course of the artificial aircraft as represented by the signal on line 109. The angular position of heading shaft 115 therefore represents directly the direction of flight or heading of an artificial aircraft flying in accordance with the signal from rate-of-turn control 108.

That course information is supplied, for example directly in terms of the shaft position, to a heading resolver, indicated schematically at 120. The speed signal on line 106 is also supplied to heading resolver 120. Heading resolver 120 may comprise any suitable mechanism that is responsive to the course signal provided by shaft 115 and to the speed signal provided over line 106, which signals together define a definite velocity; and that derives therefrom two signals that represent the same velocity in terms of its components along suitable cartesian coordinates. The resulting cartesian velocity signals, which are supplied over lines 121 and 122, respectively, may comprise, for example, electrical voltages directly proportional to components of the velocity along $x$ and $y$ coordinates that have a predetermined relationship to the direction of approach to the runway. It is ordinarily preferred to take the $x$ coordinate parallel to the runway axis and directed toward an approaching aircraft. That direction lies within the angular ranges covered by both azimuth and elevation displays of precision radar system 50.

The cartesian velocity signals, whatever their detailed nature, are supplied to respective integrating means, represented in schematic form at 125 and 126, respectively, whereby they are separately integrated with respect to time. The resulting output signals on lines 127 and 128, respectively, are proportional to the time integrals of the input signals, and represent the corresponding cartesian coordinates of the aircraft position that would result from flight at the component velocities represented by the input signals to the integrators. Those cartesian position signals may comprise, for example, electrical voltages proportional to the $x$ and $y$ coordinates of the position of the aircraft with respect to a predetermined ground zero. That ground zero may conveniently, although not necessarily, be taken at or near the position of the radar antennas of radar systems 20 and 50, which in normal practice are close together and are positioned near the touchdown point of the runway.

The control signal on line 103 from rate-of-climb control 102 may be considered to represent the component of the aircraft velocity in the vertical, or $z$, coordinate. That signal is supplied to a third integrating means, indicated at 130. Integrator 130 produces on line 131 a cartesian position signal which is proportional to the time integral of the rate-of-climb control signal on line 103, and which represents the vertical position, or height, of an aircraft flying with the rate of climb corresponding to the position of control 104. That $z$ position signal may, for example, be an electrical voltage proportional to the vertical coordinate of the position of the aircraft with respect to the ground zero.

It is characteristic of the present illustrative system that three cartesian velocity signals are separately integrated to produce three corresponding cartesian position signals. That integrating operation preserves the parallelism among the signals, which continue to correspond to respective cartesian directions in space; but modifies the significance of the signals from representations of respective component velocities to representations of respective component positions. It is noted particularly that that parallelism may not be present in the control signals as initially developed. Thus, in the present embodiment one of the three cartesian velocity signals is developed directly by rate-of-climb control 102, while the other two are not developed directly, but are derived under joint control of the independently developed speed and rate of turn signals. Nor does the described parallelism of the three cartesian position signals on lines 127, 128 and 131 extend in full to their manners of utilization by the system.

Only the $x$ and $y$ position signals are required for production of the video signal that is supplied to search system 20, since that radar system typically provides no indication of elevation. As illustrated, the $x$ and $y$ position signals are supplied from lines 127 and 128, respectively, to a computer, which is indicated schematically at 140 and which will be referred to as the R, $\theta$ computer. The function of R, $\theta$ computer 140 is to derive from the $x$ and $y$ cartesian position signals other signals that represent the position of the artificial aircraft in terms of its azimuth angle and its radial distance with respect to the coordinate zero. That computer may be of any type capable of deriving from two cartesian position signals two corresponding polar position signals. For example, computer 140 may drive a shaft, indicated schematically at 142, under joint control of the $x$ and $y$ position signals in such a way that the shaft angle continuously represents the azimuth angle of the artificial aircraft with respect to the zero of the cartesian coordinates, the shaft position thereby constituting an azimuth position signal; and an electrical range signal may be delivered by computer 140 on line 143, representing the horizontal distance of the aircraft from that zero.

The azimuth angle signal, comprising in the present instance the position of bearing shaft 142, and the search antenna position data from line 35 of search system 20 are supplied to an angle comparison means, indicated schematically at 146, which develops an angle gate on line 147. That angle gate is typically an electrical square wave the duration of which corresponds to that portion of the scansion cycle of search antenna 24 for which the azimuth of the radiated beam substantially coincides with the azimuth represented by the position of bearing shaft 142. Under that condition it follows that the angle of sweep path 37 on indicator screen 31 correctly corresponds to the azimuth angle of the artificial aircraft.

It may be noted that when (as in the present embodiment) the azimuth angle signal at 142 and the antenna angle data at 35 comprise signals of different types, the comparison means 146 must in general include means for translating at least one signal into different terms so that it may be effectively compared with the other signal.

The range signal on line 143 is utilized to develop a range gate. That range gate is typically an electrical square wave the duration of which corresponds to that portion of each sweep 37 of the cathode ray beam that lies at a radius from zero 36 corresponding to the range represented by the instant value of the range signal. For production of such a range gate, a timing signal from timing means 21 of the search radar system is supplied via line 27b to a circuit indicated schematically at 150 That circuit develops in known manner an electric wave of sawtooth form in response to each timing signal. That sawtooth wave is supplied via line 151 to range comparison circuit 153, which circuit also receives the range signal from line 143. Circuit 153 acts under joint control of the range signal and the sawtooth wave to develop on line 154 a gate in response to a predetermined relationship between them. For example, the voltage of the sawtooth wave may increase in direct proportion to the radial movement of the cathode ray beam along sweep 37; and the range signal may be a voltage directly proportional to the instant range of the artificial aircraft. With suitable choice of the proportionality constants, equality of those two voltages signifies that the cathode ray beam is at a radius from zero 36 corresponding to the aircraft range. Under that illustrative condition, comparison circuit 153 is designed to develop a range gate in response to equality of the two input voltages.

The range gate on line 154 and the angle gate on line 147 are supplied to a circuit 160, which may typically comprise a blocking oscillator, and which acts to develop on line 162 a video signal only in response to coincidence of a range gate and an angle gate. That video signal is then typically supplied by line 162 to mixer circuit 30 of search radar system 20, where it is superimposed upon the regular composite video signal of that system, and acts to intensify the cathode ray beam. Because of the described timing control of the video signal on line 162, that intensification of the beam occurs only during a sweep 37 that corresponds in angle to the azimuth angle of the artificial aircraft (as represented, for example, by the position of shaft 142); and only during the relatively small portion of that sweep that corresponds in radius to the range of the artificial aircraft (as represented, for example, by the range signal on line 143). The result is a visible indication, as typically shown at 40, on indicator screen 39 corresponding both in range and azimuth to the instant position of the artificial aircraft.

As an example of operation of the described system, it will be assumed that rate-of-turn control 108 is adjusted for zero rate of turn (that is, for flight in a straight line) and that speed control 105 is adjusted for some constant speed. Course computer 112 then holds shaft 115 in a stationary position representing the direction of flight and constituting a course signal; and a constant speed signal stands on line 106. Heading resolver 120 derives from those two constant input signals two corresponding constant output signals on lines 121 and 122, representing the respective components of the aircraft velocity along the $x$ and $y$ coordinates. Those velocity signals are separately integrated by integrators 125 and 126, producing $x$ and $y$ position signals on lines 127 and 128, respectively.

If, for example, the direction of flight represented by the position of shaft 115 is parallel to the $x$ axis, the $y$ cartesian velocity signal on line 122 will be zero and the corresponding $y$ position signal is therefore constant, since integration of zero leads to a constant. The constant value of the $y$ position coordinate need not itself be zero, however, but in general has a finite value depending on the preceding flight pattern of the artificial aircraft. The $x$ position signal, under the assumed flight conditions, increases or decreases uniformly with time, depending upon whether the $x$ velocity signal on line 121 represents flight away from or toward the origin of coordinates. Hence R, $\theta$ computer 140 receives a fixed $y$ position signal and a uniformly varying $x$ position signal. In general both the range and azimuth signals derived by computer 140 then vary nonuniformly. That variation, however, is such as to cause the representation 40 of the artificial aircraft to move across screen 39 in a straight line at a uniform velocity corresponding to the speed signal on line 106 and in a direction corresponding to the position of shaft 115. The corresponding operation of the system for other conditions of control will be understood from the preceding description.

Visual indication of the position of the artificial aircraft in the displays of precision radar system 50 can be derived from the $x$, $y$ and $z$ position signals on lines 127, 128 and 131, respectively, in a manner corresponding to that just described for deriving the search indication from the $x$ and $y$ position signals. As to the precision azimuth display 74, for example, the $x$ and $y$ position signals can be supplied to a separate R, $\theta$ computer to derive azimuth and range signals; or, indeed, the azimuth and range signals from computer 140 may be used if desired in the precision as well as in the search system. In developing a precision azimuth angle gate, for example, the azimuth signal at shaft 142 may be compared to azimuth scansion data representing the position of precision azimuth antenna 54, such data being obtainable, for example, from scansion drive 55 via line 55a. And in developing a precision range gate, the range signal on line 143 may be compared, for example, to a sawtooth wave generated in response to a timing pulse from precision timing means 51.

As to the precision elevation display, it will be understood without detailed explanation that the $x$ and $z$ position signals on lines 127 and 131 are related to the elevation display in a manner that corresponds closely to the relation of the $x$ and $y$ position signals to the azimuth display. Thus, the $x$ and $z$ position signals may be supplied to a computer of the same type as R, $\theta$ computer 140 for derivation of range and elevation signals. A range gate may then be derived from the range signal and an elevation gate derived from the elevation signal by means corresponding to those described for the azimuth coordinate. A video signal may then be derived from the two gates and mixed with the normal video that produces elevation display 76.

However, in accordance with the invention it is preferred to employ for the precision system a different type of computation, which takes advantage of the relatively restricted angular range of the precision displays and, within those limits, provides the relatively high accuracy required by the precision system with remarkable economy of instrumentation. The precision radar system is concerned primarily with aircraft actually approaching the runway along a predetermined glide path. With the $x$ axis selected parallel to the runway, such an aircraft is necessarily relatively close to the $x$ axis. Under that condition, and in fact throughout the angular range, whether in azimuth or in elevation, of the precision system, the actual range of an aircraft is very closely equal to the $x$ coordinate of its position. In accordance with the present aspect of the invention, the $x$ coordinate of the position of the artificial aircraft, derived typically as has been described, is utilized directly as the aircraft range in developing a precision video signal. It is emphasized, however, that in preferred form of the invention derivation of the signal representing that $x$ coordinate takes account of the true course of the aircraft and does not assume that course to be parallel to the $x$ axis.

As has been indicated, a range gate for the precision radar system may be developed directly from the $x$ coordinate position signal on line 127. That signal, for example, may be supplied via line 127a to a range comparison circuit 170, which also receives via line 171 a sawtooth wave which has been generated by a circuit 172 in timed relation to a timing pulse received over line 173 from timing means 51 of the precision system. The range gate, typically a square wave, is thus produced on line 174 at a time that follows the timing signal by a definite time delay, which corresponds to the range represented by the $x$ position signal.

Azimuth and elevation position signals are developed in suitable form for comparison with the antenna position data derived from the scansion drive means 55 and 65 of the azimuth and elevation antennas. Whereas such data may be of various types, it is convenient to utilize the type that is commonly developed in existing precision systems, namely a direct current voltage proportional to the sine of the scansion angle, whether azimuth or elevation.

In accordance with the present aspect of the invention, azimuth and elevation signals for comparison with antenna data of that type are developed by means of ratio resolvers, which derive signals proportional to the quotient of the $y$ and $z$ coordinates, respectively, by the $x$ coordinate. It may be noted that such signals are directly proportional to the tangent of the angle in question. However, for small values of the angle such a signal is very nearly proportional to the sine of the angle, as well as to the angle itself.

Thus, an azimuth position signal for the precision system is preferably derived by a ratio resolver, indicated schematically at 176, which is supplied with the $x$ and $y$ position signals from lines 127 and 128, respectively, and which derives a voltage signal that is proportional to the quotient of the $y$ coordinate by the $x$ coordinate, the resulting signal being produced on line 178 and being utilized as a representation of the azimuth angle $\theta$ of the artificial aircraft. Similarly, an elevation ratio resolver 180 is supplied with the $x$ position signal from line 127 and with the $z$ position signal from line 131, and produces on line 182 a signal proportional to the quotient of the $z$ coordinate by the $x$ coordinate, the latter signal being proportional to the tangent of the elevation position angle $\theta$ of the artificial aircraft, and representing that angle.

The antenna position data from lines 55a and 65a might be obtained directly via switch 71 from line 70, which receives such azimuth data during scansion in azimuth and such elevation data during scansion in elevation. Such data of alternating type from line 70 might be compared, for example, with position angle signal taken alternately from lines 178 and 182 by a synchronously operated double throw switch. In the present illustrative embodiment, however, the two angle signals are independently combined by adders 184 and 185 with the respective antenna angle data supplied from lines 55a and 65a, respectively, and the resulting signal combinations on lines 188 and 189, respectively, are supplied alternately to the discriminating circuit indicated at 186 via the switch 187. That switch is actuated as by driving means 67 synchronously with switches 69 and 71 in such phase that circuit 186 receives an azimuth signal from adder 184 during scansion in azimuth and receives an elevation signal from adder 185 during scansion in elevation. The outputs from each of the adders 184 and 185 are typically voltages that have a definite predetermined value when the aircraft position angle and the antenna position angle represented by two input signals are equal. For example, taking the azimuth case for illustration, the azimuth antenna data on line 55a may comprise a voltage having a definite functional relation to the azimuth angle of the antenna, and the azimuth position signal on line 178 may comprise a voltage having, as to magnitude, the same functional relation to the azimuth position of the aircraft, but being of opposite polarity. If those two signals are then added algebraically by adder 184, the combined signal on line 188 necessarily has the definite value zero whenever the antenna azimuth angle is equal to the aircraft azimuth position. Under that illustrative condition, discriminating circuit 186 is so arranged as to produce on line 191 an angle gate in response to zero input voltage on the line from switch 187. The single discriminating circuit 186 is thus sufficient to perform alternately the two functions of producing an azimuth angle gate on line 191 in response to a definite relation (typically equality) of the azimuth position signal from line 178 and the azimuth antenna data from line 55a; and producing an elevation angle gate on the same line 191 in response to a predetermined relation (typically equality) between the elevation position signal from line 182 and the elevation antenna data from line 65a.

The range gate on line 174 and the azimuth and elevation angle gates on line 191 are supplied to a circuit indicated at 190, which may typically comprise a blocking oscillator, and which produces on line 192 a precision video signal only in response to coincidence of a range and an angle gate. That video signal is supplied from line 192 to precision video mixer 60, where it is preferably combined with the normal video signal of the precision system. It will be seen, from the described synchronized operation of switches 69, 71 and 187, that the video signal on line 192 represents azimuth and range of the artificial aircraft during production of azimuth display 74; and represents elevation and range of the artificial aircraft during production of elevation display 76. Accordingly, that video signal produces in the respective displays visual indications, typically shown at 193 and 194, respectively, which correctly represent the aircraft position in the proper coordinates of each display.

The normal video signal of the radar system, for example the video signal on line 29 of search system 20 or on line 53a of precision system 50, tends to include various types of noise, which may under certain conditions require special skill for correct interpretation of the indicator display. It is desirable, particularly for training purposes, to provide means for simulating such noise in the artificial aircraft video signals on lines 162 and 192. That is particularly true in the case of noise of very low frequency, for example of the order of from one to ten cycles per second, which typically appears as fading of the video signal. Means for producing a signal that simulates such low frequency noise are shown schematically at 200, the low frequency noise signal being supplied via lines 202 and 203 to video signal generators 160 and 190 of the search and precision systems, respectively. Those video generators include means for modulating the amplitude of the generated video signal under control of the low frequency noise signal received from noise generator 200.

Video generators 160 and 190 preferably include means for modulating their output signals in accordance with the range of the artificial aircraft. In that way the indications on the several displays can be made to decrease in intensity with increasing aircraft range. That type of modulation greatly improves the realism of the resulting indication, in a manner that has been found of primary importance for training purposes. To produce such modulation, search video generator 160 may be supplied with a range signal from line 143, as indicated at 143a; and precision video generator may be provided with an x position signal from line 127, as indicated at 127a.

With the type of angle computation provided by ratio resolvers 176 and 180, the azimuth and elevation signals on lines 178 and 182, respectively, are meaningful only within a limited angular range. It is desirable to avoid the possibility that spurious signals might be produced that would lead to spurious indications 193 and 194 on screen 57 when the artificial aircraft is actually outside of that angular range. The present invention provides means for effectively disabling the precision portion of the artificial aircraft simulator when the azimuth of the artificial aircraft is outside of the range covered by precision azimuth display 74; and preferably also when the range of the artificial aircraft exceeds some definite value as the maximum range that appears in the precision displays. That is preferably accomplished under control of the azimuth angle signal and the range signal developed in the search portion of the system by R, θ computer 140. Those signals continue to represent the aircraft position independently of its relation to the region covered by the precision radar system. In the present embodiment, the search azimuth angle signal comprises the angular position of shaft 142 and the search range signal is typically a voltage on line 143.

As indicated at 142a, shaft 142 may extend to a suitable sector control means shown schematically at 210, which develops a video disabling signal on line 213 only in response to shaft positions that correspond to azimuth angles outside the range of precision azimuth display 74. Sector control means 210 may, for example, comprise a switch actuated by a sector cam mounted on shaft 142a. That disabling signal is supplied via line 213 to the precision portion of the system for application at any suitable point thereof to disable production of indications 193 and 194, while preferably leaving normal operation of precision radar system 50 unaffected. The disabling signal may, for example, in effect actuate a relay switch in line 192, thereby directly interrupting supply of the precision artificial aircraft video signal from video generator 190 to mixer 60. However, it is preferred to supply the disabling signal, as illustratively shown, to discriminating circuit 186 in such a manner as to prevent that circuit from producing any angle gate on line 191. In absence of an angle gate, no video signal can be developed by video generator 190, and the precision display of the artificial aircraft is effectively blanked.

It is preferred also to provide means for disabling azimuth and elevation resolvers 176 and 180 during periods in which the precision video is blanked, saving unnecessary wear on the equipment and power consumption. For that purpose a suitable signal may be generated in sector control 210 and supplied to the two resolver systems, as via the line 212. It is preferred that the azimuth angular limits beyond which the resolver disabling signal appears on line 212 be appreciably wider than the corresponding angular limits for the video disabling signal on line 213. An advantage of that arrangement, as will be explained more fully, is that as the artificial aircraft approaches the sector covered by the precision system, the precision angle resolvers 176 and 180 become energized by removal of the disabling signal on line 212 before the video signal is energized by removal of the video blanking signal on line 213, thereby permitting the resolver mechanisms to become fully accommodated to the aircraft position before their output can cause a spurious indication on the precision displays.

Precision azimuth and elevation resolvers 176 and 180 are preferably disabled also at values of the aircraft range greater than can appear in the precision display. A range actuator is indicated schematically at 220, receiving the range signal from line 143. Range actuator 220 produces on line 222 a suitable output signal in response to values of the range signal that correspond to ranges greater than some definite value. That output signal, which may, in effect, consist of the grounding of line 222, is supplied via line 222a to the two angle resolvers in a manner to temporarily arrest their operation. That disabling range signal may, for example, be combined with the disabling angle signal on line 212 in such a way that the resolvers are disabled in response to existence of either signal or of both signals. The limiting value of the range at which actuator 220 is set to initiate or remove the disabling signal on line 222 is preferably appreciably greater than the maximum range that appears in precision displays 74 and 76. That insures that indications 193 and 194 will move well off those displays with increasing range before the angle resolvers are disabled; and that with decreasing range the angle resolvers will be reactuated in time to adjust fully to the existing aircraft position before the indications can reappear in the displays. It may be noted that in the case of the range control just described much the same function could be obtained by a disabling signal generated in response to the value of the x position voltage, taken, for example, from line 127, that being the signal that is utilized as a measure of range in the precision system. However, it is preferred to control the disabling signal for the precision resolvers in accordance with the range signal developed as a part of the search system.

It is advantageous, in addition to the representations of the artificial aircraft in radar displays 38, 74 and 76, to provide direct indication of certain variables concerned with its movement and position. Typical examples of such direct indications will be described as illustrations of the invention. A heading meter 230 may comprise a rotary pointer driven, as indicated by the broken line 231, directly from heading shaft 115, the meter scale being calibrated, for example, in degrees. Such a heading meter may provide continuous indication of the compass course being flown by the artificial aircraft.

A bearing meter is represented at 234, and may comprise a similar rotary pointer driven directly from bearing shaft 142, as indicated by the broken line 235. Such a meter may be calibrated in degrees of azimuth angle, preferably in a manner corresponding to the representation of azimuth angle in search radar display 38.

The range of the artificial aircraft may conveniently be represented by a range meter, indicated at 240, which is responsive to the search range signal received from line 143 via line 143b. If that signal, for example, is a voltage directly proportional to the existing range, meter 240 may be in effect a voltmeter suitably calibrated directly in miles. In accordance with the present invention it is preferred to provide a range meter 240 having two distinct degrees of sensitivity and two corresponding scales, a relatively insensitive scale being effective when the range signal corresponds to a relatively large range, for example a range beyond the limits of the precision displays; and a relatively sensitive scale being effective at shorter ranges. Illustrative means will be described for automatically shifting the sensitivity of meter 240, and for indicating which scale is effective, in accordance with a signal received over the line 222c. That signal, as typically shown, is generated by range actuator 220, already mentioned, and is the same signal produced by actuator 220 on line 222 under control of the input range signal from line 143 and utilized as already described for disabling the precision angle resolvers.

The elevation of the artificial aircraft may be indicated directly by the elevation meter 246, which is responsive to the z position signal received from line 131 via the line 131a. If that position signal, for example, is a voltage directly proportional to the z coordinate, or elevation, of the aircraft, meter 246 may be in effect a voltmeter suitably calibrated directly in feet. It is preferred to provide two distinct sensitivities and corresponding scales for elevation meter 246, as already discussed for range meter 240. However, in the case of the elevation meter the meter is preferably shifted to its less sensitive condition not in response to variations in the quantity being indicated (elevation); but rather in response to values of the aircraft range that exceed a definite limit (for example under control of a signal received via line 222c from range actuator 220); and also in response to values of the aircraft azimuth angle that lie outside of the area covered by the precision radar system. The latter type of scale shift may be actuated under control of a signal received over the line 247 from sector control means 210 and developed in response to positions of bearing shaft 142 that correspond to azimuth angles outside the range of precision azimuth display 74. The signal on line 247 may, for example, be the same signal that is produced on line 212, already described. With the indicated type of control, the more sensitive scale of elevation meter 246 is effective only when the aircraft range and azimuth angle both correspond to values within precision azimuth display 74.

Figure 2:
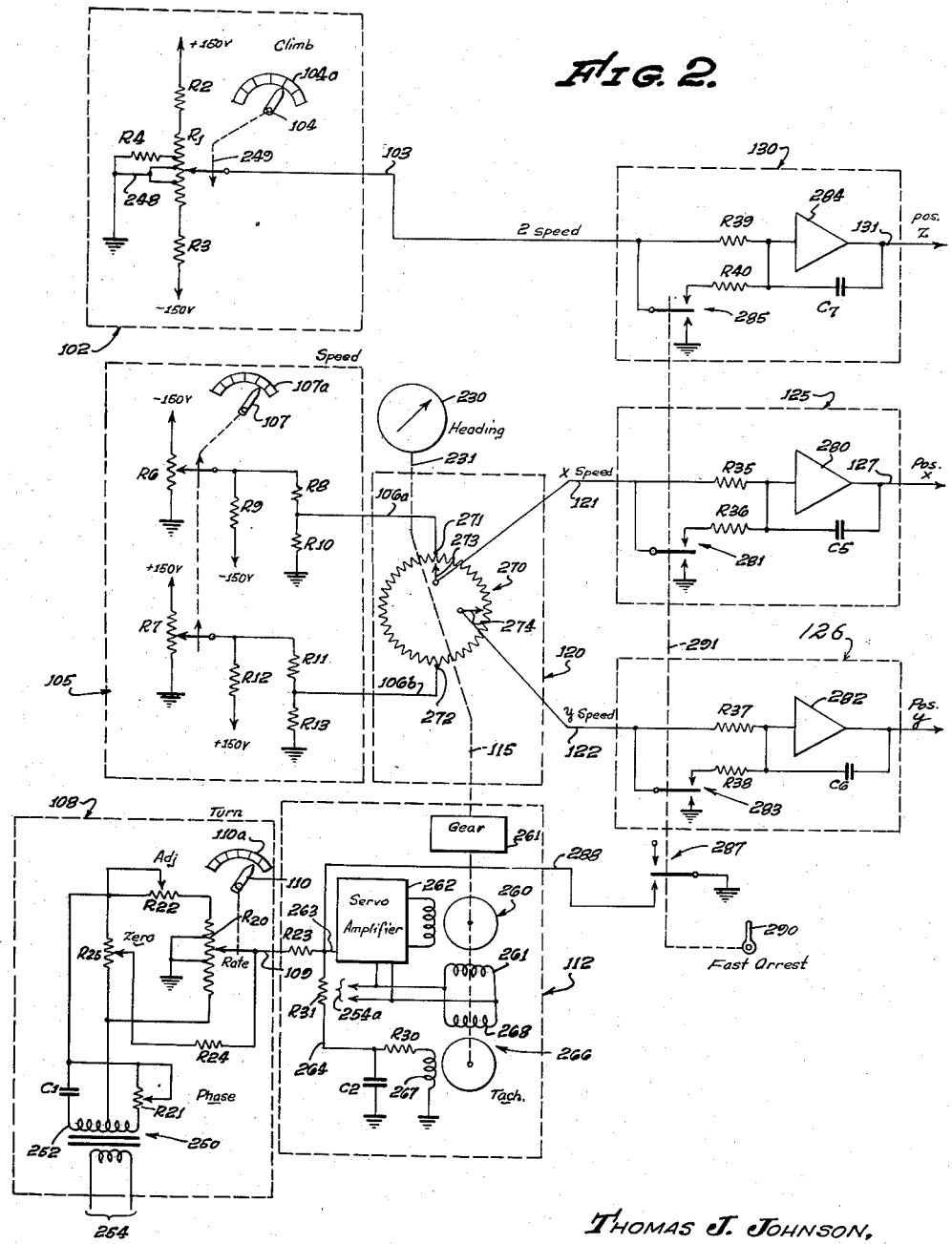
Fig. 2 is a schematic diagram corresponding to a portion of Fig. 1 and showing further illustrative structure.

Fig. 2 corresponds to a portion of Fig. 1 and further illustrates the system of that figure. As typically shown in Fig. 2, rate-of-climb control 102 comprises a potentiometer R1 which is driven directly by control knob 104 and is connected in series with resistances R2 and R3 between suitable sources of positive and negative direct current voltage, shown illustratively as +150 volts and −150 volts and conveniently obtainable from positive and negative buses connected to suitable power sources. The indicated magnitude of the voltage sources shown here and throughout this specification are to be considered as illustrative only. The central portion of R1 is preferably grounded via line 248 over a length appreciably greater than the width of the potentiometer brush, thereby facilitating zero setting of the latter. And a point spaced from that grounded portion toward negative rates of climb may be connected to ground through the relatively small resistance R4, providing an intermediate portion of the potentiometer coil in which the voltage drop per unit length is relatively low. The rate of climb signal on line 103, which may be connected directly to the potentiometer brush, then comprises a direct current voltage, of which the sign represents the direction of vertical movement of the artificial aircraft and the magnitude represents the rate of that movement. As indicated by the arrow 249, potentiometer R1 is preferably so connected that positive movement of the potentiometer, corresponding to a positive rate of climb of the artificial aircraft, produces a negative signal voltage on line 103. Thus the sign of the signal is opposite to the direction of climb. That choice has the advantage of leading conveniently to a z position signal on line 131 that is directly proportional to the elevation of the aircraft. A scale, indicated at 104a, is preferably provided at control knob 104, suitably calibrated to indicate the rate of climb to which the signal on line 103 corresponds.

Speed control 105, as illustratively shown, comprises two ganged potentiometers R6 and R7, which are driven in parallel by control knob 107 and which are connected between ground and respective sources of equal negative and positive direct current voltage. The speed signal comprises respective negative and positive voltages of equal magnitude on the respective lines 106a and 106b, shown schematically in Fig. 1 as the single line 106. The lines 106a and 106b might be connected directly to the brushes of potentiometers R6 and R7, respectively. However, in the embodiment illustrated, those connections are made through networks comprising R8, R9, R10 and R11, R12, R13, respectively, which produce a substantially logarithmic relation between the angular position of a control knob 107 and the resulting speed signal on lines 106a and 106b. That may be considered illustrative of the numerous types of non-linear relation that may be found desirable for convenience of operation. A scale, indicated at 107a, is preferably associated with speed control knob 107, and is suitably calibrated to indicate for each position of the knob the speed represented by the speed signal on lines 106a and 106b.

Rate-of-turn control 108, as illustratively shown, comprises a potentiometer R20 driven by control knob 110 and connected across a source of alternating current voltage. That source comprises the secondary 252 of a transformer 250, of which the primary is supplied, for example, with 60 cycle current from a regular power source 254. One end of R20 is preferably connected directly to a center tap on the transformer secondary, and the other end to the junction of capacitor C1 and variable resistor R21, which are connected in series across the transformer secondary, thereby providing phase adjustment of the current in R20 by variation of R21. A variable resistor R22 in series with R20 provides adjustment of the magnitude of that current. The central portion of R20 is preferably grounded over a length appreciably greater than the brush width. Output line 109 is connected directly to the potentiometer brush and also via a relatively large resistor R24 to the brush of a potentiometer R25, also of relatively large resistance, which is connected in parallel with R20, R22. Potentiometer R25 then permits the signal on line 109, for zero setting of R20, to be varied slightly from zero as may be required to balance the system to which it is supplied.

The rate of turn signal on line 109 is then an alternating current voltage of which the magnitude represents the speed of turn of the artificial aircraft and the phase with respect to source 254 represents the direction of turn. As an illustration, like phase between the signal and source 254 will be taken to represent a turn to the right or clockwise, and opposite phase a turn to the left or counterclockwise. A scale 110a is preferably provided in association with control knob 110, suitably calibrated to indicate the rate and direction of turn to which the signal on line 109 corresponds.

The rate of turn signal on line 109 is supplied to course computer 112, by which it is integrated with respect to time to derive a course signal representing the course of the artificial aircraft. As already indicated, that course signal may typically comprise the rotational position of a heading shaft 115. In the embodiment of Fig. 2, shaft 115 is driven under control of the rate of turn signal by means of a servo type speed control.

The servomotor 260 drives shaft 115 via a reduction gear indicated at 261. Motor 260 is controlled as to its speed and direction by the servo amplifier 262, which may be of conventional design. The input error signal at 263 to amplifier 262 is derived by addition of the rate of turn signal on line 109, developed by rate-of-turn control 108 as already described, and a balancing signal from line 264. That balancing signal is derived from one end of the output coil 267 of a generator 266 of tachometer type, the other end of coil 264 being grounded. The field coil 268 of the generator receives alternating current power from a source 254a, which is in phase with source 254 and which also powers servo amplifier 262 and the field coil 261 of motor 260. Tachometer generator 266 is mechanically driven directly by motor 260, and produces an alternating current voltage of which the magnitude is proportional to the speed, and the phase depends upon the direction of rotation. The voltage thus produced in coil 267 is supplied via a phase adjusting network R30, C2 to line 264 and is added to the signal voltage on line 109 by the two resistors R23 and R31. The resulting alternating current voltage at 263 is supplied as error signal to servo amplifier 262. The output from amplifier 262 drives motor 260 at such speed and direction that the voltage from tachometer 266 virtually cancels the rate of turn signal, maintaining the error signal to the amplifier substantially zero. The ratio of reduction gear 261 and other constant factors of the system are so selected that shaft 115 is driven at a speed (for example in degrees per second) equal to the aircraft rate of turn represented by the position of potentiometer R20 of the rate of turn control. The angular position of shaft 115 then continuously represents the heading of the artificial aircraft.

Heading resolver 120, as illustratively shown in Fig. 2, comprises a sine potentiometer 270, which is driven directly by heading shaft 115. The positive and negative coil terminals 271 and 272 of potentiometer 270 are supplied with the speed signal voltages from the respective lines 106a and 106b. Those voltages will be designated S and —S, respectively. The cosine brush 273 of the potentiometer is connected directly to line 121, and the sine brush 274 is connected to line 122. The position of the potentiometer is so related to shaft 115 that the potentiometer angle T respresents the aircraft heading as measured with respect to the $x$ axis, which in turn is preferably taken parallel to the runway axis. The direct current voltage at sine brush 273, which is equal to $S \sin T$, and the voltage at cosine brush 274, which is equal to $S \cos T$, are then proportional to components of the aircraft velocity along the respective $x$ and $y$ coordinates, and correctly represent the $x$ and $y$ velocity components.

An illustrative preferred manner of providing modification of the action of integrators 125, 126 and 130 to selectively arrest movement of the artificial aircraft or to accelerate that movement is shown in Fig. 2. Integrator 125, for example, preferably comprises a highly stabilized direct current coupled amplifier of high gain and high input impedance, the voltage output being of opposite polarity to the input. Such an amplifier, indicated schematically at 280, is shown in typical detail in Fig. 6. The amplifier output is connected directly to line 127 and is coupled via the relatively large capacitor C5 to its input, normally at ground potential. The $x$ speed voltage from line 121 is normally supplied to the input of amplifier 280 via the relatively large resistor R35. Any difference of that $x$ speed signal from ground causes current to flow in R35, producing at the amplifier output a voltage of opposite sign that acts through C5 to maintain the amplifier input voltage substantially zero. That output voltage equals the negative of the time integral of the current flowing in R35 divided by the capacitance of C5. The output on line 127 is therefore proportional to the negative of the time integral of the $x$ speed signal divided by the product of the resistance of R35 and the capacitance of C5. For example, R35 may be 1 megohm and C5 may be 10 microfarads. Then if 5 volts on line 121 represents, for example, a speed of 360 miles per hour in the negative $x$ direction, 5 volts on line 127 will represent a position displaced 1 mile in the positive $x$ direction from the coordinate zero.

In accordance with the present aspect of the invention, as illustrated, a double throw switch 281 has its armature connected to line 121, its lower contact grounded, and its upper contact connected to the input of amplifier 280 via a resistor R36 having a resistance less than that of R35 by a definite factor of 5 or 10, for example. For normal operation of the system switch 281 remains open. Closure of switch 281 to its upper contact applies R36 in shunt to R35, reducing the effective resistance and thereby increasing the rate of change of the output $x$ position voltage on line 127 for any given input $x$ speed voltage on line 121. The apparent speed of the artificial aircraft in the $x$ direction is thereby increased in the ratio of $(R35+R36)/R36$. Closure of switch 281 to its lower contact grounds line 121, in effect applying to the integrator an $x$ speed signal of zero, and causing the output $x$ position voltage to remain unchanged during that switch condition.

A similar switch 283 is provided for controlling the action of amplifier 282 of $y$ integrator 126 by selectively applying resistor R38 in shunt to the regular integrating resistor R37 or by grounding line 122; and a switch 285 is operable similarly to apply resistor R40 in shunt to integrating resistor R39 of $z$ integrator 130 or to ground line 103. The three described switches 281, 283 and 285 are preferably operable in parallel either to fast position or to arrest position from a fast-arrest control knob 290, as indicated by the dashed line 291. That type of control has the particular advantage that shifting of control knob 290 to fast position causes the aircraft to move with accelerated speed but in the same direction that it was previously moving. The velocity signals are in effect all increased by the same factor, thereby maintaining their ratios unchanged. If it is desired to change the aircraft heading, that can, of course, be done by manipulation of rate-of-turn control 110.

Fast-arrest control 290 preferably operates also a fourth switch 287 which is normally open and is closed by movement of knob 290 to arrest position. Closure of switch 287 grounds a line 288, which is connected to the error input to servo amplifier 262 of course computer 112, stopping motor 260 regardless of the position of rate-of-turn control knob 110. Movement of heading shaft 115 is thereby temporarily arrested. That has the advantage that when the fast-arrest control is shifted to arrest position the artificial aircraft not only remains stationary as to its position in the several displays, but maintains its instant heading without change throughout the period of arrest. Such arrest of movement may be useful, for example, to permit explanation by the instructor of a particular problem before the trainee is asked to work out its solution. It is advantageous when normal operation is resumed after such an interruption that the artificial aircraft continue flight in the direction it was heading when arrested. Switch 287 insures that condition without requiring manual setting of rate-of-turn control 110 to zero during the arrest period and its resetting to its previous position after that period.

Figure 3:
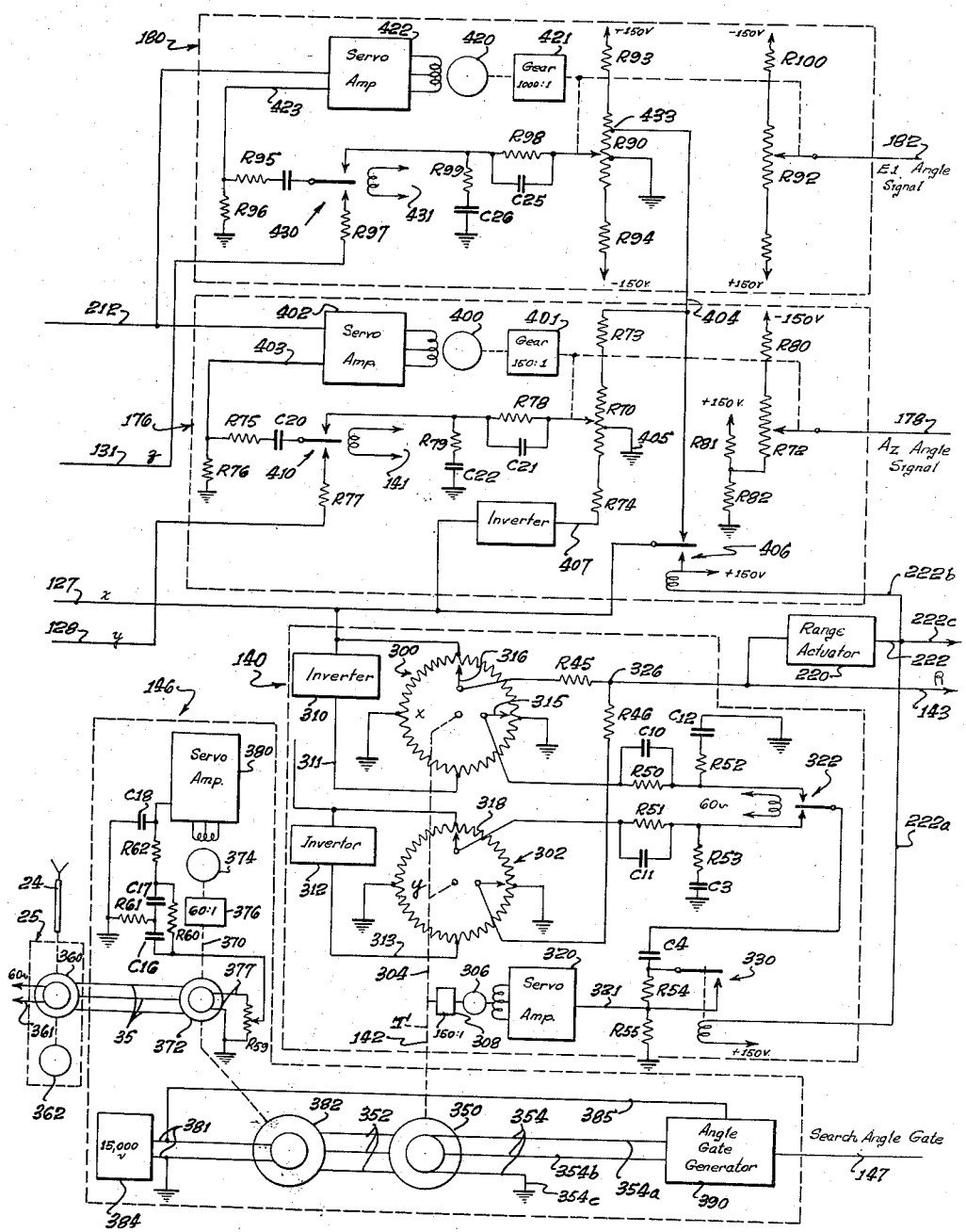
Fig. 3 is a schematic diagram corresponding to another portion of Fig. 1 and showing further illustrative structure.
Figure 7:
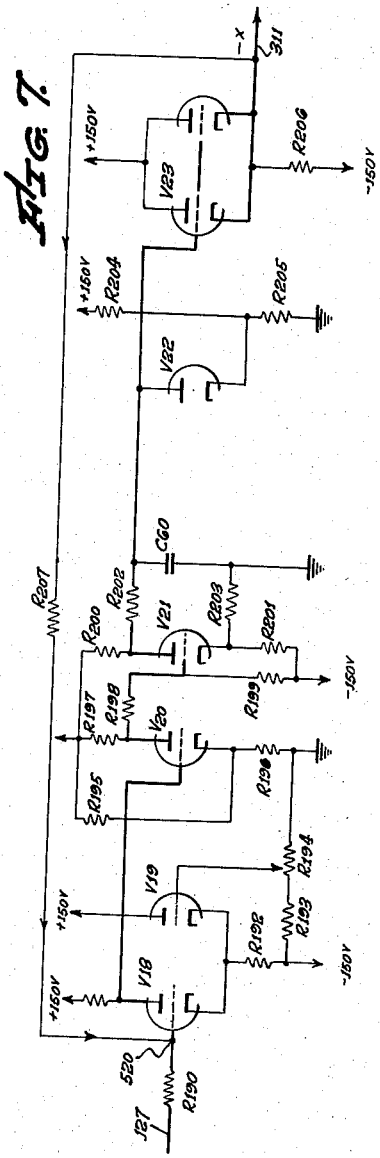
Fig. 7 is a schematic diagram representing illustrative means for inverting the polarity of a signal.

A preferred type of R, θ computer 140 in accordance with the invention is illustratively shown in Fig. 3. Two sine potentiometers 300 and 302 are driven in tandem, as via the drive shaft 304, by a servomotor 306 via the gear reduction 308. The common angular position of the potentiometers will be represented as U. The x coordinate position signal from line 127 is supplied directly to the positive coil terminal of potentiometer 300, and is also supplied to an inverter, shown schematically at 310. Inverter 310 may be any device that produces an output signal on line 311 that is substantially equal in magnitude to the input signal from line 127, but of opposite polarity. The inverted signal is supplied via line 311 to the negative coil terminal of potentiometer 300. The y coordinate position signal from line 128 is similarly supplied to the positive coil terminal of sine potentiometer 302, and a corresponding inverted signal, derived by an inverter 312, is supplied via line 313 to the negative coil terminal of that potentiometer. An illustrative type of inverter suitable for use at 310 and 312 is shown in Fig. 7. The output signal from sine brush 315 of sine potentiometer is then proportional to $x \sin U$, and that from cosine brush 316 is proportional to $x \cos U$. The output signals from sine brush 217 and cosine brush 218 of potentiometer 302 are similarly proportional to $y \sin U$ and $y \cos U$.

A servo amplifier, shown schematically at 320, is supplied via line 321 with an input error signal that represents the difference between the voltage at sine brush 315 of potentiometer 300 and the voltage at cosine brush 318 of potentiometer 302. That error signal may, for example, be derived from the defined voltages by a chopper switch 322, driven in synchronism with the alternating current power supply employed for amplifier 320. The output of servo amplifier 320 drives motor 306 and shaft 304 in a direction to reduce that error signal. The result is to maintain substantial equality between the voltage at sine brush 315, which is proportional to $x \sin U$, and the voltage at cosine brush 318, which is proportional to $y \cos U$. The servo condition is thus $$x \sin U = y \cos U \quad (1)$$

In accordance with the present invention, that condition is utilized to maintain the angle U of shaft 304 equal to the polar position angle θ that corresponds to the cartesian coordinates x and y. From Fig. 4b it will be seen that $\sin \theta = y/R$ and $\cos \theta = x/R$, where R is the distance from the origin to the point $(x, y)$ and corresponds to the range of the aircraft from the coordinate zero. By introducing in Equation 1 the relation $$U = \theta + d \quad (2)$$

where d simply represents the difference between U and θ, and substituting the values just given for sin θ and cos θ, it can be shown that $d=0$. Therefore, if Equation 1 is satisfied, for example, by action of a servo drive of the type described, it follows that the resulting shaft position U correctly represents the position angle θ of point $(x, y)$. The described type of computer is capable of deriving from cartesian coordinate signals of any point $(x, y)$ a shaft position representative of the corresponding angular polar coordinate. As utilized in the present embodiment, shaft 304 is so driven that its angular position U is equal to the polar position angle θ of the artificial aircraft whose cartesian coordinates x and y are represented by the input signals from lines 127 and 128. Shaft 304 therefore corresponds directly to shaft 142 of Fig. 1, and its position constitutes an azimuth angle signal.

A particular advantage of the described computer is that a range signal may be derived in a very convenient manner. For example, cosine brush 316 of potentiometer 300 and sine brush 317 of potentiometer 302 may be connected together through respective identical series-connected resistors R45 and R46. The direct current voltage at the junction 326 of those resistors then represents the radial distance R between the artificial aircraft at $(x, y)$ and the coordinate zero. For that voltage equals the average of the direct current voltages at the brushes 316 and 317. Since the potentiometer shaft angle U has been shown to equal θ, that average is proportional to:

$$x \cos \theta + y \sin \theta = R \quad (3)$$

Accordingly, the voltage at junction 326 may be applied directly to line 143 and utilized as a range signal for derivation of a range gate on line 154, as already described, and for other purposes to be described.

As shown illustratively in Fig. 3, the $x \sin U$ signal from brush 316 and the $y \cos U$ signal from brush 318 are supplied to chopper switch 322 via respective circuits comprising parallel-connected R50, C10 and R51, C11, respectively, and series-connected shunts to ground R52, C12 and R53, C13, respectively, which are selected in accordance with known principles to stabilize the action of the servo loop through amplifier 320. The signal from the armature of chopper switch 322 is supplied to input connection 321 of servo amplifier 320 via the isolating capacitor C14 and the attenuating network comprising the series resistor R54 and the grounded resistor R55 which may represent the input grid resistor of the amplifier. The effect of R54, R55 is shiftable between two conditions in accordance with the position of relay switch 330. That switch, which is connected in shunt to R54, is normally open, causing attenuation of the error signal to amplifier 320 in the approximate ratio of $$R55/(R54+R55)$$

which may, for example, be about 1/5. Actuation of relay 330 short circuits R54, removing that attenuation. As will be described, relay 330 is typically operated via line 222a under control of the range signal on line 143 in such a way that it is actuated only at ranges less than some predetermined value. That has the desirable result of making the effective sensitivity of the servo drive of bearing shaft 142 more nearly uniform over a wide range of variation of the x and y signals on lines 127 and 128, and particularly of insuring effective servo operation at relatively low values of those signals.

Fig. 3 includes in schematic form a preferred type of angle comparison means 146, for deriving an angle gate when the scansion angle of search antenna 24 corresponds to the azimuth position angle θ of the artificial aircraft, as represented by the position of shaft 304. A synchro differential generator, indicated at 350, is driven with bearing shaft 142 and is supplied via line 352 with an input signal that represents the scansion angle of search antenna 24. The output on line 354 then represents the difference between that scansion angle and the angle θ of shaft 142.

The input signal on line 352 to differential generator 350 might, for example, be derived directly from a synchro generator, such as that indicated at 360, driven with search antenna 24. Such a synchro generator 360, together with an antenna driving motor 362 normally are included in antenna control 25, the output from generator 360 being supplied on line 35 to yoke drive 34 (Fig. 1). That synchro generator is normally provided with 60 cycle power, as indicated at 361. It is preferred, in accordance with the present invention, to operate differential generator 350 at a higher frequency, such, for example, as 1500 or 15,000 cycles per second, since the output signal on line 354 is then better adapted for performing electronic control functions accurately and rapidly.

That upward shift of signal frequency is preferably provided in the following illustrative manner. An antenna follow-up shaft 370 is driven in synchronism with the scansion movement of search antenna 24. Whereas that drive may be accomplished by many types of mechanical linkage with scansion drive 25, it is preferred to drive shaft 370 by a follow-up servo system, under control of suitable antenna position data received from scansion drive 25. As illustrated in Fig. 3, the output of synchro generator 360, is taken from line 35, and is supplied as control voltage to a synchro control transformer 372, which is driven with follow-up shaft 370 by a motor 374 through reduction gear 376. The output of control transformer 372 is taken from line 377 via amplitude control potentiometer R59 and via a phase adjusting stabilization network comprising R60, R61, R62, C16, C17, C18, and is supplied as error signal to servo amplifier 380. Amplifier 380 drives motor 374 in a direction to reduce the error signal, thereby maintaining the angle of shaft 370 equal to the angular position W of antenna 24 in its scansion movement.

A synchro generator, indicated at 382, is driven with follow-up shaft 370 and is supplied via line 381 with alternating current power of relatively high frequency, typically shown as 15,000 cycles per second. Such power may, for example, be generated in known manner by an electronic oscillator, indicated schematically at 384. The output of synchro generator 382 on line 352 then comprises a three-phase signal that effectively duplicates the antenna data on line 35 and represents the antenna scansion angle W, but has the desired higher frequency. That signal is supplied as control signal to synchro differential generator 350, which produces on line 354 a three-phase signal that represents the difference $W-\theta$ between the antenna scansion angle and the azimuth angle of the artificial aircraft. One phase of that signal, taken between line 354a, say, and grounded line 354c, is then a 15,000 cycle alternating current voltage with amplitude proportional to the sine of $W-\theta$; and the corresponding signal between line 354b and ground is proportional to $\sin(W-\theta+120°)$.

Figure 8:
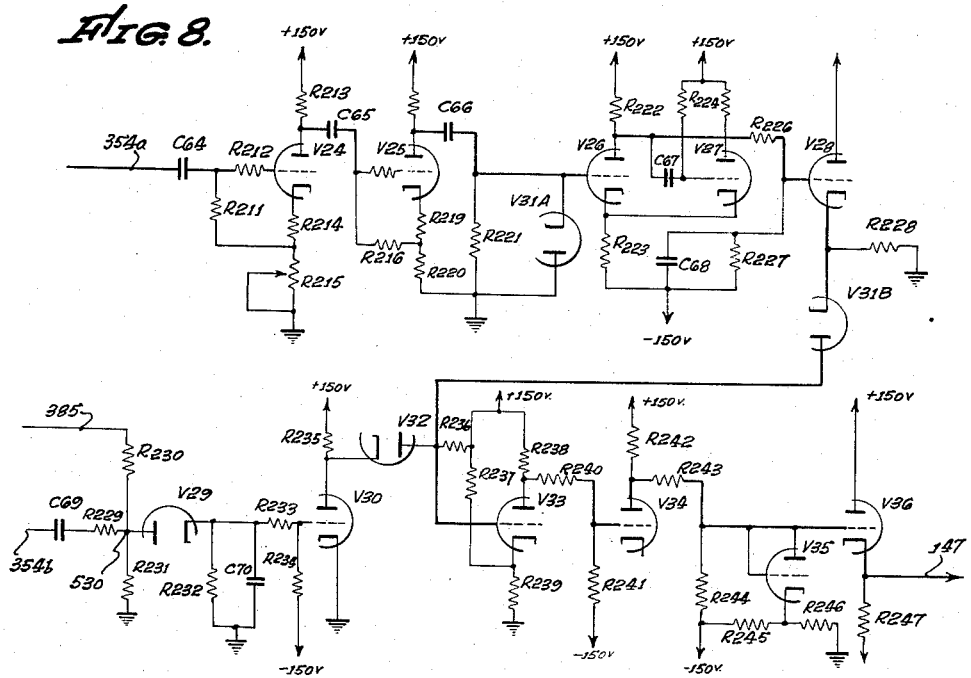
Fig. 8 is a schematic diagram representing illustrative means for developing a search angle gate.

Those signals are supplied, together with a reference frequency signal from oscillator 384 via line 385, to circuitry indicated at 390 and shown illustratively in Fig. 8, which is a phase and ambiguity detector responsive to the condition $$W-\theta=0$$

and which develops on line 147 an angle gate, preferably of adjustable duration, in response to that condition. That angle gate on line 147 and the range gate on line 154 jointly control production by video generator 160 of a search video signal on line 162, as already described in connection with Fig. 1.

In the precision system, azimuth resolver 176, as shown illustratively in Fig. 3, comprises the potentiometers R70 and R72 driven in gang via a reduction gear 401 by a servo motor 400 under control of the servo amplifier 402. The winding of potentiometer R70 has an intermediate point grounded via line 405, and is connected in series with resistors R73 and R74 between the line 404, supplied via the normally closed switch of relay 406 with the x position signal from line 127, and the line 407, which is supplied directly with the inverted x position signal. Relay 406 is controlled by range actuator 220, and is preferably actuated at ranges outside of the precision displays, avoiding unnecessary power load on the x position signal on line 127. The inverted x position signal may be derived, for example, from line 127 via inverting means 408, as illustrated, or may be taken from the output of inverter 310 of R, θ computer 140 in the search system. The error signal supplied via line 403 to servo amplifier 402 represents the difference between the y position signal on line 128 and the voltage tapped from potentiometer R70. As illustrated, that error signal is supplied via the network C20, R75, R76 from the chopper switch 410. One pole of that switch receives the y position signal from line 128 via resistor R77; and the other pole is connected to the brush of potentiometer R70 via a phase adjusting network comprising R78, C21 and R79, C22. The armature of chopper 410 is driven, as by a solenoid supplied with alternating current at 411, at the same frequency and in definite phase relation to the alternating current power supplied to amplifier 402. The chopper thus develops on line 403 a signal of which the magnitude and phase represent the absolute value and the polarity of the difference between the y position signal and the voltage tapped from potentiometer R70. The latter voltage is equal to the x position signal multiplied by some function $f(p)$ of the potentiometer brush position p. The servo loop thus acts to maintain the potentiometer position p such that:

$$xf(p)=y$$

Hence:

$$f(p)=\frac{y}{x} \qquad (4)$$

The second potentiometer R72, driven in gang with R70, is preferably identical with the latter and is connected between suitable fixed sources of potential such that the voltage at each point of the winding of R72 is proportional in magnitude to the voltage at the corresponding point of R70. The voltage tapped from R72 is therefore proportional to $y/x$ from (4), so that it represents the tangent of the azimuth position angle $\theta$ of the artificial aircraft (Fig. 4). That relation does not require that the two potentiometer functions $f(p)$ be of any particular form, so long as they are substantially identical (within the range required). Linear potentiometers are ordinarily more accurate and convenient. For convenience of utilization of the signal, the constant of proportionality between the voltage tapped from R72 and tan $\theta$ is made negative. As shown, the upper terminal of R72, corresponding to the terminal of R70 that receives the x position signal uninverted, is connected via R80 to the negative bus, and its lower terminal is connected to a source of positive potential at the junction of voltage divider R81, R82. The resulting signal from the brush of potentiometer R72 is supplied over line 178 as the azimuth position voltage, already referred to in connection with Fig. 1.

Elevation resolver 180 may be substantially identical in structure and operation to azimuth resolver 176, just described, except that its chopper switch 430 is supplied with the z position signal from line 131 instead of the y position signal from line 128. As shown, elevation resolver 180 comprises ganged potentiometers R90 and R92, driven by servo motor 420 via gear reduction 421 under control of servo amplifier 422. The error signal for the amplifier is taken via line 423 from chopper switch 430 and represents the difference between the z position signal and the voltage tapped from R90. The output voltage from potentiometer R92 of resolver 180 is then proportional to $z/x$, and represents the tangent of the angle of elevation $\phi$ of the artificial aircraft, the constant of proportionality being negative. That voltage is supplied on line 182 as elevation position voltage.

Elevation resolver 180 is required to give an output accurately proportional to $z/x$ only when the elevation angle $\phi$ lies within the range covered by elevation display 76. That range of $\phi$ extends typically from zero to only 5° or 10°. However, to avoid spurious results and to prevent wear of the servo drive due to unnecessary searching, it is desirable that some solution of the servo condition be available for all possible values of $\phi$. To satisfy that requirement, potentiometer R90 must, for example, sometimes provide voltages more positive than the x position signal, in order to provide a solution for the servo condition when $\phi$ is greater than 45° (z greater than x). As illustrated, an intermediate tap 425 on the winding of R90 is grounded, and another tap 433 is supplied with the x position signal via line 404 and relay 406, already described. The end of the potentiometer winding beyond tap 425 is connected via the relatively large resistor R94 to the negative bus, and the end of the winding beyond tap 433 is connected via the resistor R93 to the positive bus. The value of R93 is such that for all positive values of the $z$ position signal an equal voltage will stand at some point of R90, that point being between taps 433 and 425 if $z$ is less than $x$, and on the positive side of tap 433 if $z$ is greater than $x$. The portion of R90 on the negative side of tap 425 similarly provides a servo solution in case the $z$ signal should for any reason become slightly negative. Similar provision may be made in azimuth resolver 176 for insuring a servo solution when $y$ is greater than $x$. However, in the present embodiment that is not necessary, since under that condition the servo mechanism is in any case disabled via line 212. The problem would be similarly avoided in the case of the elevation resolver if elevation servo amplifier 422 were disabled under control of the elevation in addition to the present disabling action via line 212 under control of the azimuth angle.

Fig. 5 shows in illustrative form details of sector controller 210, of range actuator 220 and of certain of the circuits that they typically control. Relays 330 and 406, controlled via lines 222a and 222b by actuator 220, are shown in Fig. 3 and have already been described. The range signal, development of which at junction 326 of Fig. 3 has already been described, is supplied by line 143 to cathode follower isolating tube V1 of range actuator 222. For convenience of description, the term "tube," as used here and throughout the specification, is intended to include a vacuum tube or other equivalent device; and tube units are in general designated by distinct numerals, although two or more such units may be combined in a single envelope, as is sometimes indicated in the drawings.

The output of cathode follower V1 is supplied via line 450 as range signal to range meter 240, that line performing the function represented broadly in Fig. 1 by line 143b. That same range signal is supplied to a comparison circuit that distinguishes between values of the signal corresponding to ranges greater and less, respectively, than some definite value. As shown, that comparison circuit comprises tubes V2 and V3, which are connected in a modified Schmitt circuit with the relatively small common cathode resistor R117. The grid of V2 is supplied with the range signal via R114 from potentiometer R112, which is connected in series with the relatively large resistor R113 between the cathode of V1 and the negative bus. At ranges less than the critical value, V2 is cut off and V3 conducts, setting the cathode of V2 at a definite relatively high positive potential dependent upon voltage dividing action of R116, R117. With increasing range V2 starts to conduct at a critical value determined by that potential and by the setting of potentiometer R112. V3 is then sharply cut off, shifting its cathode to a relatively low positive potential. The resulting negative going signal at the cathode of V3 is lowered in level by R118, R119 and is applied to the grid of V4, the cathode of which is grounded. That tube is cut off at ranges longer than the critical value, and is rendered conductive at shorter ranges. Output line 222 is connected via resistor R120 to the plate of V4. That line is therefore effectively open at large values of the range, but draws current from a positive voltage source at ranges lower than the critical value.

Line 222 is connected via lines 222a and 222b to the coils of relays 330 and 406, respectively, as shown in Fig. 3, through which it performs the functions already described. Range actuator 220 also acts via line 222c to control the sensitivity of range meter 240 and of elevation meter 246 in an illustrative manner now to be described. The range meter, as typically shown, is a milliammeter connected as a voltmeter, with the two resistances R125 and R126 series connected between one meter terminal and the range signal at the cathode of tube V1, and with the other terminal connected to the brush of potentiometer R128, which forms part of the voltage divider R127, R128, R129 between ground and the positive bus. Adjustment of R128 provides adjustment of the zero of the range meter. Two conditions of sensitivity of the range meter are provided by shunting R126 through normally open switch A of the relay 460, the desired sensitivity ratio being determined by selection of the values of R126 and R125. The coil of relay 460 is connected between the positive bus and, via line 241, output line 222 of range actuator 220. At ranges less than the selected critical value, relay 460 is actuated, shorting out R126 and increasing the sensitivity of range meter 240.

A normally open second switch B of relay 460 is connected between ground and the cathode of a neon indicating tube 462. The anode of tube 462 is connected via resistor R130 to the positive bus. Tube 462 is mounted adjacent the scale of range meter 240. It lights when the meter is on its more sensitive scale, but is extinguished by opening switch B when the meter is on its less sensitive scale, providing positive indication of which meter scale is in operation.

A normally closed third switch C of relay 460 is connected between ground and the line 464, and acts to ground that line at ranges greater than the described critical value. Line 464 is connected also via line 247 to a cam actuated switch 466 of sector control 210. That switch, as schematically shown in Fig. 5, comprises the sector cam 467, which is driven with bearing shaft 142, and the grounded switch arm 468. The cam face is so formed and mounted with relation to its shaft that switch 466 is closed, grounding lines 247 and 464, when the position of shaft 142 corresponds to an aircraft position that is outside of the angular range of precision azimuth display 74 (Fig. 1) by some definite margin. That margin may, for example, be about 5°. Thus, if the azimuth range covered by display 74 extends, for example, from −8° to +20°, switch 466 may be open at azimuth angles from −13° to +25°, and be closed at azimuth angles outside that range. The control signal on line 464 is thus produced jointly by sector switch 466 and by range-operated relay switch 460c. That signal controls the elevation meter and also provides a disabling signal for the precision video.

Elevation meter 246, as illustratively shown in Fig. 5, has one terminal grounded and the other connected via series resistors R132, R133 and R134 to line 131, which receives from integrator 130 the $z$ position signal representing the $z$ coordinate position, or elevation, of the artificial aircraft. However, that elevation position may in practice vary over a wide range, and it is preferred that the elevation meter be relatively sensitive. In accordance with the invention, the maximum voltage that may appear across meter 246 is limited by connecting the junction of R133, R134 via line 468 to the plate of limiting tube V5, the cathode of which is set at a predetermined positive voltage by voltage divider R135, R136. That voltage is preferably so selected as to limit the voltage across meter 246 to some safe value, such, for example, as 1.5 times the voltage that will give full scale deflection. That protection is effective for both degrees of sensitivity of the meter circuit, controlled by relay 470.

The relay 470 has its coil connected between the positive bus and line 464, and is thus actuated by grounding of the latter line whenever the range of the artificial aircraft exceeds the predetermined critical limit and/or whenever the azimuth angle lies outside the predetermined angular range that includes the range covered by the precision azimuth display. Relay 470 has a normally closed switch B, which is connected in shunt to resistor R133, which is in series with elevation meter 246 between line 131 and the described junction with line 468. Outside of the predetermined azimuth and range limits, actuation of relay 470 opens switch B, shifting elevation meter 246 to its less sensitive range. Within both of those limits, which means in effect within the area covered by the precision azimuth display, switch B is closed, shorting R133 and thereby shifting the elevation meter to its more sensitive range.

Neon indicating tube 474 is connected in series with resistor R137 between ground and the normally closed contact of switch A of relay 470, the armature of which is connected to the negative bus. Tube 474 is therefore energized whenever elevation meter 236 is on its less sensitive scale, and is dark when the meter is on its more sensitive scale, providing positive indication to the operator which scale is in use.

The normally open switch A of relay 470 is connected to an output line indicated at 212. Line 212 supplies a disabling signal, shown as the potential of the negative bus, to the servo amplifiers 402 and 422 of precision resolvers 176 and 180, respectively, whenever the artificial aircraft is, in effect, outside of the area covered by the precision azimuth display. As already explained, cam 467 is so designed that the critical azimuth angles at which that disabling signal is removed are appreciably outside of the azimuth range actually covered by the precision azimuth display.

As illustrated, sector control 210 includes a second switch 496, comprising a sector cam 497 controlling a switch arm 498. One terminal of switch 496 is connected to the negative bus and the other terminal to output line 213. Cam 497 is preferably driven with cam 467 and is similarly shaped, but is arranged to open switch 496 within a range of azimuth angles that is more restricted than the corresponding range for switch 466. The angular range for which switch 496 is open may correspond closely to the azimuth range represented in precision azimuth display 74 (Fig. 1). Line 213 supplies a signal which disables the precision video signal of the artificial aircraft simulator at azimuth angles outside of that range. As here illustratively shown, that signal is supplied by line 213 to angle comparator 186, where it acts to disable the precision angle gate. Due to the difference in the critical sectors of cams 467 and 497, the video signal is not restored, as the precision aircraft approaches the azimuth range of the precision display, until an appreciable time after precision resolvers 176 and 180 have been restored to operation by removal of the disabling signal from line 212. Hence the precision resolvers are enabled to adjust fully to the new position of the artificial aircraft (which may, for example, be at the opposite border of the precision display from that at which the resolvers were last disabled) before a video signal can be produced.

An alternative type of sensitivity control for elevation meter 246 is shown illustratively in Fig. 5A, which corresponds to the upper portion of Fig. 5. The circuit of Fig. 5A provides a relatively sensitive meter response for elevations less than some predetermined value, and less sensitive response for elevations greater than that value. A single meter scale may be employed, as indicated at 246a, having a relatively expanded lower portion and a relatively compressed upper portion. That relation is quite distinct from that of Fig. 5, in which the meter is shifted between two degrees of sensitivity under control of variables other than the elevation itself.

As shown, meter 246a receives the z position signal from line 131 via the series resistors R133a and R134a. A limiting tube V5a, shown as a diode, has its plate connected via the resistance R138 to the junction of R133a, R134a and its cathode connected directly to the junction 469 of voltage dividing resistances R136b and R135b, R135c, connected between the positive bus and ground. That voltage divider maintains the cathode of V5a at a predetermined potential within the range of variation of the elevation signal on line 131. For example, if that signal varies from 0 to 50 volts in direct proportion to variations of the elevation from 0 to 30,000 feet, the cathode of V5a may be held by the voltage divider at 10 volts. Then the shunt circuit through V5a is inoperative at elevations from 0 to 6,000 feet, and the effective sensitivity of meter 246 within that portion of its range is determined directly by series connected R133a, R134a. At elevations above 6,000 feet, meter 246 and R134a are shunted via R138 and V5a to junction 469, reducing the effective sensitivity of the meter by a definite factor. If R136b and R135b, R135c are not small compared to R138, their values must be considered in calculating the effect of the shunt. In fact, by suitable selection of the values of the voltage divider, R138 may be omitted. In either case, by making one of the voltage divider resistors variable, as indicated for R135c, the elevation at which the effective meter sensitivity changes can be made adjustable. Components are selected to provide a factor of sixteen, for example, between the effective sensitivity of meter 246 with and without the shunt, and with the typical voltage relations already described, 20% of the entire elevation range may be made to occupy 80% of scale 246a, with the remaining 80% of the elevation range compressed into 20% of the scale. As indicated in Fig. 5A, a protective shunt circuit via tube V5 may be provided, as already described for the circuit of Fig. 5, in addition to the scale controlling shunt via V5a. Voltage divider R135a, R136a is selected to cause V5 to draw current only after meter 246 has reached full scale.

Figure 6:
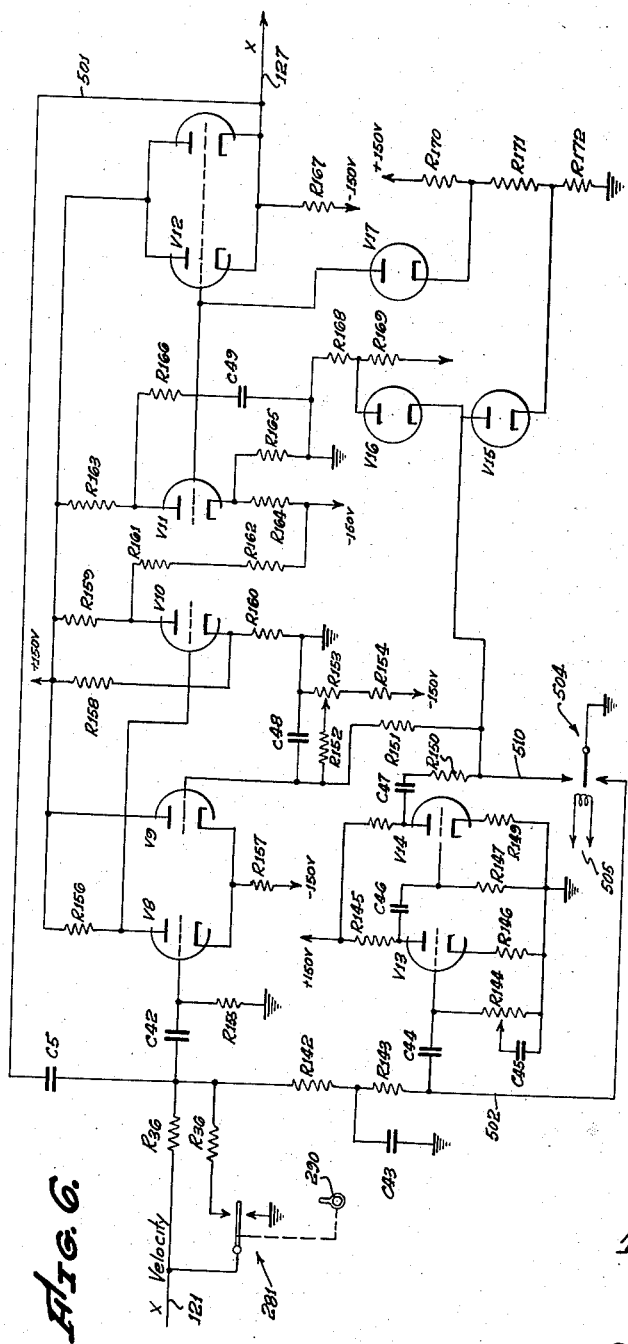
Fig. 6 is a schematic diagram representing illustrative means for integrating an electrical signal.

The integrating circuits indicated schematically at 125, 126 and 130 may be of any suitable type. Fig. 6 shows an illustrative preferred integrating circuit of Miller type utilizing a chopper-stabilized D.C. amplifier, which is here typically described as integrator 125 for the x coordinate. That amplifier responds to any departure of the junction 500 of the input circuit from a predetermined normal potential, typically ground potential, to apply to C5 via feedback line 501 sufficient charge to restore the junction substantially to that potential. The current flowing through R41 due to the x velocity signal on line 121 is therefore closely proportional to the signal voltage, and the cumulative charge carried by that current is proportional to the time integral of the signal voltage at 121. That cumulative charge flows into C5. The potential across that capacitor, which is the potential of the amplifier output on line 127, is therefore proportional to the negative of the time integral of the input signal.

The direct current signal on line 121, representing the rate of change of the x coordinate of the artificial aircraft position, varies slowly under normal conditions, but may change rapidly under special conditions, for example, if speed control 105 is moved quickly, or if switch 281 is shifted by manipulation of fast-arrest control 290. The relatively high frequency components of the signal reaching junction 500 are supplied via C42 to the grid of tube V8, and appear in amplified and inverted form on the tube plate. The low frequency and D.C. components of the signal appearing at junction 500 are transmitted via filter network R142, R143, C43 to the line 502. That line is intermittently grounded via one contact of double throw chopper switch 504. That switch is driven, as by a solenoid supplied at 505 with alternating current at a frequency typically in the audio range. That current may, for example, be from the regular 60 cycle power supply. An alternating current signal is thereby supplied via capacitor C44 to the first grid of two-stage amplifier V13, V14, the signal amplitude being proportional to the voltage difference from ground of junction 500, and the signal phase with respect to the movement of switch 504 depending upon the polarity of that voltage difference.

The output is taken from the plate of tube V14 as a wave of relatively large amplitude, and is passed through isolating capacitor C47 and resistor R150. The phase of the resulting signal on line 510 is discriminated by clamping at ground potential either the peaks or troughs of the wave via the second contact of chopper switch 504. The amplitude of the resulting wave is limited to a few volts, either above or below ground, by the limiting diodes V15 and V16. That wave is detected by the filter comprising series resistor R151 and grounded shunt capacitor C48. The resulting signal, which is an amplified replica of the low frequency and D.C. components of the initial signal at junction 500, is recentered to a slightly negative potential, which is adjustable for balancing the system, by connection via the relatively high resistor R152 to the potentiometer R153, which is connected in series with R154 between ground and the negative bus. The recentered signal is supplied to the grid of tube V9, which shares the common cathode resistor R157 with tube V8. Tube V9 acts as a cathode follower with respect to the signal just described, supplying it to the cathode of V8 for further amplification and mixing with the high frequency components of the initial signal. Tube V9 also tends to compensate the effects on V8 of any line voltage variations.

The combined output from the plate of V8 is further amplified by the D.C.-coupled tubes V10 and V11, and is delivered to line 127 via cathode follower V12. The feedback via line 501 to integrating condenser C5 is taken directly from line 127. The output may be limited at the grid of tube V12, such limitation being shown illustratively via diode V17 for the high potential side only. In the case of integrator 130 for the z coordinate signal, the output is preferably limited also on the low side to substantially ground potential, since the value of the z position coordinate is never negative.

Any suitable means may be employed for deriving from a given signal a corresponding signal of inverted polarity, as indicated, for example, at 310, 312 and 408 of Fig. 3 for supply to a control potentiometer. An illustrative preferred circuit for that purpose is shown in Fig. 7 as typically employed at 310 for inverting the $x$ signal from line 127 for supply to the negative terminal of sine potentiometer 300. The inverter of Fig. 7 comprises a high gain amplifier receiving as input the $x$ coordinate signal from line 127 via the relatively high series resistor R190, and delivering its output on line 311. That output is fed back via resistor R207 to the input of the amplifier. Because of the high gain of the amplifier, that feedback loop acts to maintain the amplifier input at the junction 520 between R190 and R207 at substantially constant predetermined potential. If that potential is ground and if R207 equals R190, the output voltage on line 311 is an inverted replica of the initial signal on line 127.

The signal from junction 520, always substantially at ground potential, is applied directly to the grid of tube V18, the cathode of which is tied to the cathode of tube V19 and is variable in level in response to variations in current drawn by that tube through common cathode resistor R192. Tube V19 tends to stabilize V18 against line voltage variations, and permits convenient adjustment of the overall balance of the amplifier by variation of the grid potential of V19 at potentiometer R194. The output from the plate of V18 is further amplified successively by V20 and V21, the signal being recentered by voltage divider R198, R199 before application to the grid of the latter tube. The output from the plate of V21 is limited on the positive side to approximately 50 volts by diode V22, and is delivered via cathode follower V23 to output line 211.

The circuit indicated in block form at 390 in Fig. 3 includes means controlled by the differential angle signals on line 354 and responsive to the condition of those signals that corresponds to equality of the azimuth scan angle W and the artificial aircraft azimuth position angle $\theta$. In the present embodiment, that function involves detection of the differential generator signal on one wire of line 354, taken illustratively as line 354a, which has zero amplitude when those angles are either equal or 180° apart; and utilization of the signal on the other wire 354b of line 354 to discriminate between those two conditions and select only the former. The circuit further responds to equality of the defined angles by generating an angle gate on line 147.

An illustrative preferred type of circuitry 380, as represented in Fig. 8, includes two detection channels I and II. Channel I receives from differential generator 350 via line 354a a modulated 15,000 cycle signal, the amplitude of which, as already explained, is proportional to sin $(W-\theta)$. That signal amplitude passes through zero twice during each scansion cycle of search antenna 24, once when the antenna azimuth angle W equals the azimuth $\theta$ of the artificial aircraft, and once when $$W = \theta + 180°$$

Channel I produces at the cathode of tube V28 a positive gate corresponding to each such null.

In channel I, as typically shown, the signal on line 354a is amplified by tubes V24 and V25. The degree of amplification is sufficient to saturate the plate circuit of V25 at all signal peaks not near a null, and is adjustable, as by bias variation of V24 at potentiometer R215, to modify the envelope of the signal near a null. The output from the plate of V25 is passed through capacitor C66 to the grid of tube V26, the negative swings of the signal being restored substantially to ground potential by diode V27 and resistor R221. The grid of V26 therefore receives periodic positive pulses at a frequency of 15,000 cycles, the amplitude of those pulses being normally uniform, but going rapidly to zero symmetrically about each null of the initial signal. The sharpness of that decrease is controllable by the setting of R215.

Tube V26 is the normally idle tube of a multivibrator circuit V26, V27. Each positive pulse (of sufficient amplitude) at the grid of V26 cuts off normally conductive tube V27 and transfers conduction to V26. Conduction then returns to V27 upon discharge of C67 through R224 at a time prior to the next such pulse. The plate of V25 therefore produces negative going square waves of uniform amplitude and of 15,000 cycle frequency, but interrupted at each null of the initial signal when the positive pulses at the grid of V25 are insufficient to trigger the multivibrator. The number of square waves so omitted at each null is adjustable by the setting of R215.

The described output from the plate of V25 is applied to the grid of cathode follower tube V28 via a filter network comprising R226, R227 and C68 which effectively removes the 15,000 cycle component, leaving an envelope that appears as a series of positive-going gates corresponding to the nulls of the original signal. Those square waves, as taken from the cathode of V28, extend from a base voltage substantially at ground potential to a peak value typically about 15 volts. However, only alternate gates correspond to signal nulls for which $W=\theta$.

Channel II discriminates among the gates produced by channel I, making effective only those for which $W=\theta$. The signal on line 354b from differential generator 350 is a 15,000 cycle wave modulated in proportion to sin $(W-\theta+120°)$, and displays nulls displaced from those of line 354a by 120° of scansion movement. That signal is added by resistors R229, R230 to an unmodulated 15,000 cycle standard frequency of equal amplitude supplied via line 385 from oscillator 384 (Fig. 3). That standard frequency is in phase with the signal on line 354b between alternate pairs of nulls, and is in opposite phase the remainder of the time. The resulting voltage at the junction 530 between R229 and R230 is a 15,000 cycle signal modulated in proportion to $$1 + \sin(W-\theta+120°)$$

The latter function varies sinusoidably between 0 and 2 with a period equal to the scansion period of antenna 24. Its value is about 1.87, or close to its maximum, when $W=\theta$, and is about 0.13, or close to its minimum, when $W=\theta+180°$. The signal at 530 therefore provides a convenient means for distinguishing between the null gates from channel I that correspond to those two conditions.

The signal at junction 530 is detected by the diode V29 and the filter network R232, C70, producing at 532 a signal representing substantially the function $$1+ \sin(W-\theta+120°)$$

That signal is recentered downward by R233, R234 and is supplied to the grid of tube V30. The level of the signal with relation to the grounded cathode of V30 is so determined that the tube is cut off during approximately the negative half of each signal cycle and conducts strongly during the remainder. The resulting signal developed at the plate of V30 is typically an effectively square gate extending from a base voltage near ground to a strongly positive peak. The base voltage, as shown, exists during the nulls of channel I for which $W=\theta+180°$, and the positive voltage exists during those nulls for which $W=\theta$.

The null gates from the cathode of V28 in channel I and the discriminating gates from the plate of V30 in channel II are applied via the isolating diodes V31 and V32, respectively, to the grid of tube V33. That grid is tied via the large grid resistor R236 to a strongly positive potential, and the tube cathode is normally set at a moderately positive potential by connection to voltage divider R237, R239. The diodes are connected to pass the negative going portions of the respective gating signals. The grid of V33 is thus normally held close to ground, substantially cutting off the tube, by current through one diode or the other. Only when the cathodes of both diodes are raised well above ground by coincidence of a null gate and a discriminating gate is the grid of V33 raised via R236 to render the tube conductive for the duration of that coincidence. Hence a negative going square wave appears at the tube anode in response only to those null gates of channel I that correspond to $W=\theta$. The width of each gate is variable, as already described, at potentiometer R215. That gate is amplified and inverted by V34 and is delivered to line 147 via cathode follower V36 as a positive going angle gate. The base voltage of that gate is set at a large negative value at the grid of V36 by voltage divider R243, R244; and the peak value is limited, also at the grid of V36, by tube V37 to a moderately negative value determined by voltage divider R245, R246.

An illustrative preferred sawtooth generator circuit for use at 150 in the search system and at 172 in the precision system (Fig. 1) is represented in Fig. 9. For definiteness the figure will be described with reference to the search system. Tubes V41 and V42 comprise a monostable multivibrator with respective plate resistors R255 and R259 and common cathode resistor R256. Tube V42 normally conducts and the resulting voltage drop in R256 raises the cathode of V41 above the potential of its grid, set by voltage divider R253, R254, cutting off V41. A trigger tube V40 has its plate connected directly to the plate of V41, which is coupled by capacitor C72 to the grid of V42. The positive going system trigger of the regular search radar system 20 is supplied from line 27b (Fig. 1) via a blocking capacitor C71 to the grid of trigger tube V40, which grid is normally held below cutoff potential by voltage divider R251, R252. Each trigger pulse makes V40 momentarily conductive, developing across R255 a voltage pulse which trips the multivibrator, cutting off V42 and shifting conduction to V41. That sharply reduces the current through common cathode resistor R256, since R255 is larger than R259. Discharge of C72 through R258 and R257 in series returns conduction to V42 after a time that corresponds at least to the largest target range to be handled. That time is preferably adjustable, as by variation of R257. A substantially square negative-going gate thus appears at the cathode of V42, the leading edge of the gate forming a negative step function that coincides with the system trigger.

Tubes V43 and V44 are connected in a bootstrap sawtooth generator circuit. Switching tube V43, with its cathode directly connected to the negative bus and its grid returned via the relatively large grid resistor R260 to ground, normally draws current from the positive bus through diode V45A and resistances R262, R263 and R264. R262 is variable. The junction 541 of R263, R264 is connected via C75 to ground and is prevented from going below ground potential by diode V45B. Junction 541 is connected also to the grid of cathode follower tube V44, the plate of which is connected directly to the positive bus. The cathode of V44 is connected via R262 to the negative bus and via C74 to the junction 542 of R262 and V45A. The negative square wave from multivibrator V41, V42 is supplied via C73 to the grid of switching tube V43, cutting off that tube, and allowing C75 to charge via R263, R262. The potential across those resistances is maintained substantially uniform as C75 charges, since current flow via C74 from the cathode of V44 raises junction 542 in direct correspondence with junction 541. Diode V45A behaves then as an open circuit, so that all current to charge C75 is supplied via C74. The resulting sawtooth at junction 541 is applied directly to output line 151. The slope of the sawtooth wave, which in practice determines the range scale of the cathode ray display, is adjustable by variation of R262.

The sawtooth wave is terminated when arrival of the trailing edge of the square wave at the grid of V43 makes that tube again conductive, drawing junction 541 and the grid of V44 down to the level set by diode V45B. Capacitor C74 is returned rapidly to its initial condition by current flow through R265 and diode V45A.

A range comparison circuit suitable for use at 153 of the search system or at 170 of the precision system (Fig. 1) is shown in illustrative preferred form in Fig. 10, and will be described for definiteness as a part of the search system. The sawtooth timing wave from line 151 of Fig. 9, for example, and the range signal from line 143 are supplied to the respective grids of tubes V47A and V47B, connected as a differential amplifier with respective plate resistors R266 and R268 and common cathode resistor R267. Action of the differential amplifier is sharpened, as will be described, by the unidirectional connection between the two plates via diode V46. Before application to the grid of V47B, the range signal is recentered upward by resistors R270 and R269, the latter being connected via the brush of potentiometer R271 to a variable point of voltage divider R271, R272. A bypass to ground is preferably provided via C80.

During each timing wave the sawtooth voltage on line 151 starts at a value (substantially ground) less than the range signal voltage at the grid of V47B, and increases substantially linearly throughout the wave, passing the range voltage after a time that increases with the range. Hence, at the start of each timing wave tube V47B conducts, lifting the common cathode potential to a level that is approximately equal to the range signal voltage and that wholly or substantially cuts off V47A. However, the plate potential of V47A is held substantially equal to that of conductive tube V47B by conduction through the diode V46, of which the plate and cathode are connected directly to the plates of V47A and V47B, respectively. That diode has the effect, under the conditions described, of placing R266 in the plate circuit of V47B in parallel with R268. As the timing voltage approaches the range voltage, conduction through V47A increases, raising the common cathode potential and reducing current through V47B. That action tends to lower the plate of V47A and to raise that of V47B; but at first little actual change of plate potential takes place, due to the shorting action of diode V46. However, at the moment the increasing current in V47A attains a definite relation to the decreasing current in V47B, that relation being typically substantial equality, the potential across V46 is effectively reversed, and that tube becomes effectively an open circuit. From that point on, the circuit acts substantially like a conventional differential amplifier, conduction shifting abruptly from V47B to V47A with production of a sharp negative going step at the plate of V47A and a positive going step at the plate of V47B. The effect of the diode is to prevent that sharp switching action as V47A first reaches its threshold of conduction, and to cause the switching to take place instead at a later stage of the cycle when both tubes are conducting approximately equally, and hence when both tubes are on the linear portions of their operating characteristics. The resulting improvement in operation is particularly marked when it is necessary or desirable to use tubes of subminiature type.

The negative step at the plate of V47A and the simultaneous positive step at the plate of V47B occur at a definite time following the system trigger that initiated the sawtooth wave. That time increases directly with the range signal on line 143, and is also longer the higher the level to which that signal is recentered by adjustment of potentiometer R271. The latter adjustment can be utilized, for example, to compensate any systematic time difference between the system trigger and the actual start of the corresponding sweep of the cathode ray beam in the display system.

The negative and positive voltage steps are supplied via C76 and C77, respectively, to the grids of tubes V48B and V48A, which are connected in a second differential amplifier with common cathode resistance R274, R275. An amplified and sharpened positive going step is taken from the plate of V48B, differentiated by C78, R280, and applied as a positive going pulse to the grid of tube V49, which is normally cut off by return of its grid to a negative potential at the junction of R278, R280. That tube becomes conductive during the peak portion of the pulse, developing at its plate a sharp negative going range gate, which is delivered via blocking condenser C79 to line 154. The leading edge of that gate is delayed with respect to the system trigger by a time that corresponds to the range of the artificial aircraft.

Substantially identical circuitry to that of Figs. 9 and 10 may be used at 172 and 170, respectively, of the precision system, the trigger input to capacitor C71 being taken from precision system trigger generator 51 via line 273 (Fig. 1), and the range-representing signal to the grid of tube V47B preferably comprising the x position signal from x integrator 125, which is supplied via line 127a. As already stated, that x position signal has been found to provide a fully satisfactory representation of range within the area typically covered by the precision system, and to be more reliable and economical than a range signal developed in a more elaborate manner. On the other hand, a specially developed range signal, for example that produced on line 143 by computer 140, may be supplied to the precision range comparator. The precision range gate from the plate of tube V49 is supplied via C79 to line 174.

Figure 11:
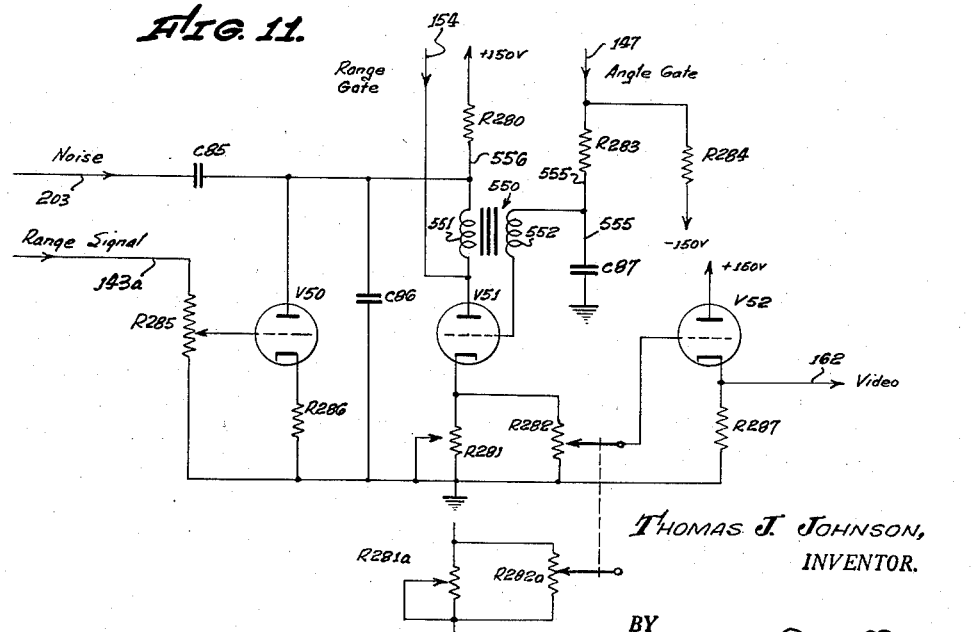
Fig. 11 is a schematic diagram representing illustrative means for developing a noise and range modulated video signal in response to range and angle gates and corresponding to an artificial aircraft.

An illustrative preferred circuit is shown in Fig. 11 for generating a video signal in response to coincidence of angle and range gates and for modulating that signal to provide enhanced realism in the indicator display. For definiteness Fig. 11 will be described as it relates to video generator 160 of the search system, substantially identical circuitry being adapted for use at 190 of the precision system. Tube V51 is connected in a blocking oscillator circuit with relatively small cathode load comprising variable cathode resistor R281 and potentiometer R282 connected in parallel to ground. The tube plate is connected via the primary 551 of transformer 550 and the relatively large resistor R280 to the positive bus. The tube grid is connected via the secondary 552 of transformer 550 and resistor R283 to line 147 over which the angle gate is supplied from angle comparator 146 whenever the scansion angle approximately equals the azimuth angle of the artificial aircraft. Line 147 is shunted via resistance 284 to the negative bus, and holds the grid of V51 normally at a strongly negative potential, cutting off V51. During each angle gate the grid is raised to about −15 volts, still below cutoff. The junction 555 between R283 and the transformer secondary is by-passed to ground via C87. The junction 556 between R280 and the transformer primary is bypassed to ground via C86.

A control tube V50 is connected, together with its relatively small cathode load R286, in parallel with C86, so that it shares R280 as plate impedance with V51. The potential of junction 556 and of the tube plate in idle condition of the circuit is determined primarily by R280, V50 and R286, acting as a voltage divider; and C86 is charged to that potential.

The range gate from line 154, comprising a sharp negative going pulse from capacitor C79 of Fig. 10, is supplied directly to the plate of V51. That range gate pulse draws a current pulse through the transformer primary from C86, producing in the grid circuit a corresponding pulse which raises the grid momentarily by approximately 20 volts. In absence of an angle gate on line 147 the tube remains cut off, and the range gate is ineffective to produce a video signal. In presence of an angle gate on line 147, the range gate raises the grid above cutoff, drawing additional current from C86 through the transformer primary and cathode load R281, R282. Regenerative action of the transformer on the grid circuit produces a sharp pulse of plate current in the tube, which is cut off sharply by opposite action once the current starts to decrease as C86 becomes discharged. Plate resistor R280 is preferably large enough that relatively little current is drawn directly from the positive supply during the short period of tube conduction. Output is taken from a variable point of cathode resistor R282 and is preferably supplied via a cathode follower tube V52 to output line 162. The output on line 162 is a sharp positive pulse, and is supplied as video signal to mixer 30 of search radar system 20.

Each angle gate is typically wide enough to include several successive range gates, resulting in a series of video signals which intensify the cathode ray beam on tube screen 39 at definite points of several successive sweeps, the average angle of the sweeps corresponding to the position angle of the artificial aircraft, and the position of the intensified point along each sweep corresponding to the aircraft range.

It is preferred to modulate the video signal in accordance with aircraft range and also in a random manner that simulates the low frequency noise or fading that is typical of actual radar operations. In accordance with that aspect of the invention, such modulation may be accomplished by control of the potential standing at junction 556 during idle condition of the circuit just described. That potential determines both the plate voltage of V51 and the charge standing on C86. Therefore the amplitude of the output pulse, and the degree of intensification of the cathode ray beam vary directly with the idle potential of junction 556 at the moment of circuit actuation. In the particular circuit shown, that potential is varied under control of the range of the artificial aircraft by action of control tube V50, and is varied in a random manner by direct application of a noise signal from line 203 via blocking capacitor C85. As shown, the range signal from line 143a is supplied via a variable attenuator comprising potentiometer R285 to the grid of control tube V50. Cathode resistor R286 may be selected to bias the tube substantially to cut off at zero range, or at any other selected value of the range and predetermined setting of R285. Increase of the range beyond that selected value, or shift of R285 to decrease the attenuation of the range signal then draws increasing current through V50, lowering the potential of junction 556 and decreasing the amplitude of the video signal delivered to line 162.

With the average level of junction 556 adjusted as just described, the actual level is caused to vary in a random manner about that average value in response to the noise signal from line 203. In the circuit as shown, the noise signal is applied via blocking capacitor C85 directly to junction 556, and is added to the range modulation on the common impedance R280. The amplitude of that noise signal is preferably adjustable at noise generator 200, as will be described. With the noise signal on line 203 at a definite amplitude, its apparent effect upon the brightness of the artificial aircraft indication is typically relatively slight at low aircraft ranges, and increases with the aircraft range. That effect, which corresponds to experience with actual radar operations, results directly from the described combination of range modulation and noise modulation. For, as the potential of junction 556 is lowered under control of increased range, it approaches more closely the level at which blocking oscillator V51 is entirely unresponsive to coincidence of angle and range gates. The more closely that condition is approached by virtue of range modulation, the more frequently does a given level of noise modulation momentarily disable the circuit, momentarily blanking the video output. The resulting representation of the artificial aircraft is thereby made remarkably realistic, and can scarcely be distinguished on the indicator displays from a direct radar indication of an actual aircraft.

If further dependence of the effective noise upon range is desired, any suitable circuitry may be provided for directly modulating the noise signal on line 203 as a function of the range signal on line 143a. Such modulation may be provided, for example, in a very simple manner by omission of blocking capacitor C85 in the circuit of Fig. 11, line 203 being then connected directly to junction 556. With that modification, any decrease, say, of the voltage standing at junction 556 with decreasing range causes a corresponding decrease in the plate potential of output amplifying tube V85 of the low frequency noise generator, as typically shown in Fig. 13, to be described. With suitable selection of that tube and of its operating conditions, that voltage decrease may be caused to produce a corresponding decrease in the gain of the tube, effectively attenuating the noise signal produced on line 203.

Precision video generator 190 may be substantially identical with the typical search video generator of Fig. 11. However, it receives precision range and angle gates over lines 174 and 191, respectively, which take the place of lines 154 and 147 of Fig. 11; and receives a noise signal via line 202 from noise generator 200. The range modulating signal supplied to the grid of V50 in such a precision video generator may be an actual range signal, such as that on line 143a, but is preferably the x position signal, supplied typically via line 127a (Fig. 1). The precision video output is taken via line 192 and mixer 60 to precision indicator tube 56.

In the illustrative circuit of Fig. 11, intensity of the output video signal may be controlled independently by variation of cathode resistor R281 or by adjustment of potentiometer R282. That dual control, which is preferably provided in both the search and the precision video generators, permits convenient control of both the relative intensity of the search and precision video signals, and of their absolute intensity. For example, R281 of the search system and the corresponding variable resistor of the precision system, indicated at R281a in Fig. 11, may be independently controllable to determine the relative signal intensities by modification of the bias of the respective tubes; and potentiometer R282 of the search system and the corresponding potentiometer R282a of the precision system may be controllable in gang, as indicated in Fig. 11, to modify both video signals in a coordinated manner.

Figure 12:
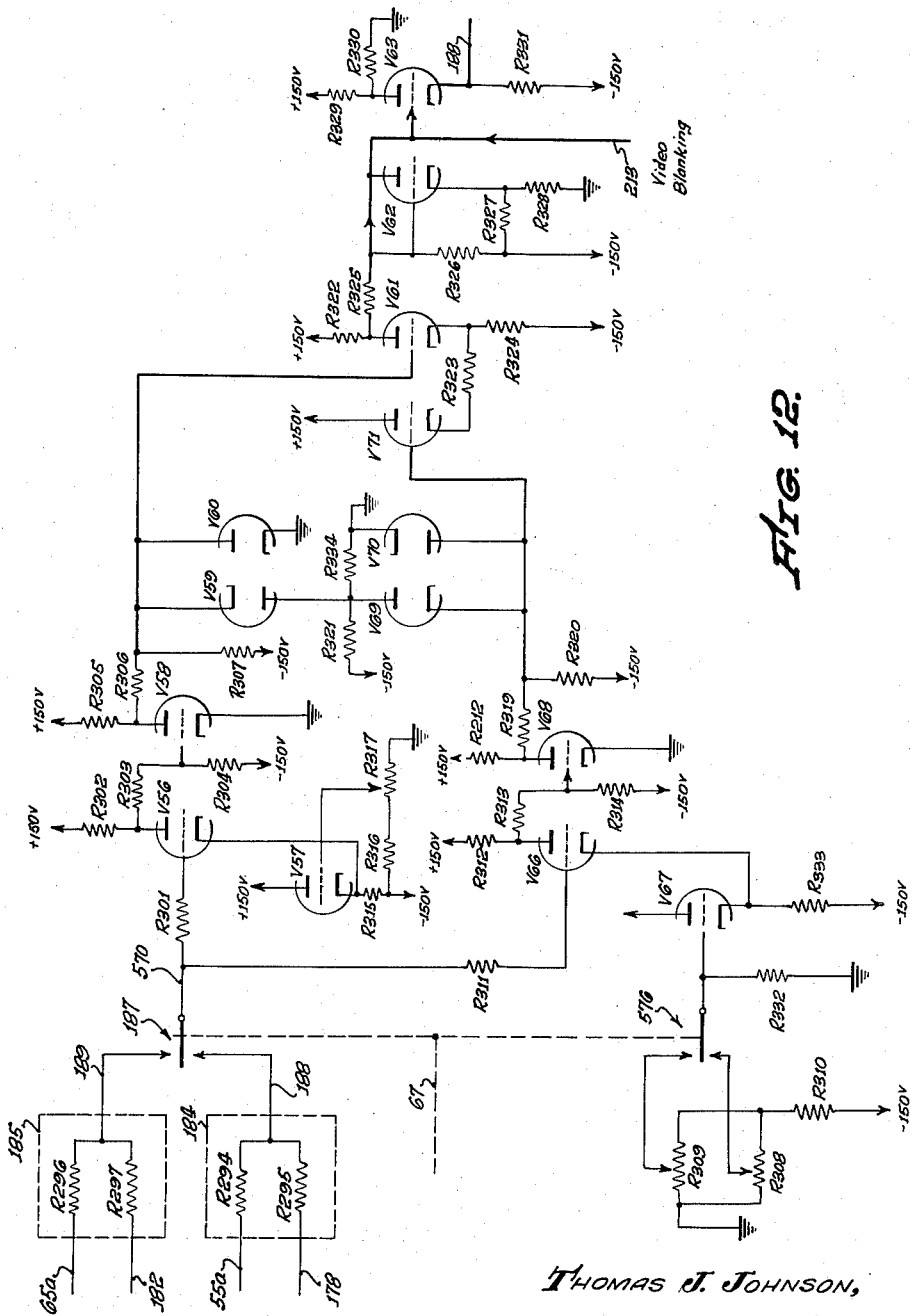
Fig. 12 is a schematic diagram representing illustrative angle comparison circuitry for developing an angle gate in the precision system.

Angle comparison circuit 185 of Fig. 1, which develops an angle gate for the precision system, and corresponds in broad function to the circuit of Fig. 8 in the search system, is shown in an illustraive preferred form in Fig. 12. It comprises two independently adjustable step-generating channels I and II, which control the respective tubes of differential amplifier V65A, V65B. A positive going gate is developed at the plate of V65B, initiated by the leading edge of the step from one channel and terminated by the leading edge of the step from the other channel, the two channels alternating in function with the direction of scansion movement of the precision antennas.

The input to the two channels is taken via isolating resistors R301 and R311, respectively, from the common input line 570. That line receives via switch 187 an input signal that represents the difference between the azimuth scansion angle of precision azimuth antenna 54 and the azimuth position angle of the artificial aircraft when the switch is in one position (lower position as shown); and represents the difference between the elevation scansion angle of precision elevation antenna 64 and the aircraft elevation position angle when the switch is in its other position. For example, those difference signals may be generated by azimuth and elevation adders 184 and 185, respectively. As illustratively shown, adder 184 comprises two equal resistances R294 and R295, respectively, having one terminal of each connected to output line 188, and their other terminals connected to lines 55a and 178, respectively. The latter lines, as already explained, carry signals typically proportional to the sine of the scansion angle of the azimuth antenna and to the negative of the tangent of the azimuth angle of the artificial aircraft. Since, within the range of azimuth angles covered by the precision system, the sine and the tangent are approximately equal, zero signal at the junction of resistors R294 and R295 indicates substantial equality in azimuth between the antenna position and the aircraft position. Similarly, zero signal on line 189, connected to the junction of resistors R296 and R297 in elevation adder 185, indicates that the signal on line 65a, typically proportional to the sine of the scansion angle of elevation antenna 64, and the signal on line 182, proportional to the negative of the tangent of the aircraft elevation position angle, are equal and opposite, so that the antenna elevation substantially coincides with the aircraft elevation. Switch 187 samples alternately the difference signals on lines 188 and 189, being driven via a control 67 in synchronism with the antenna drives as already described, so that the appropriate signal is supplied to line 570 during effective scansion of each antenna.

Each of the antenna data signals on lines 55a and 65a typically is a direct current voltage that increases from −2 volts to +50 volts during scansion in one direction and decreases from +50 volts to −2 volts during scansion in the other direction. The difference signal on line 570 correspondingly is a positive-going or a negative-going voltage wave, depending upon the direction of antenna scansion; and passes through zero in either case when the antenna position substantially passes through the position of the artificial aircraft.

Considering first channel I, the cathode of tube V56 is tied to that of compensating tube V57, and their common potential is normally determined by the grid of V57, which is adjustably set at a slightly negative value by potentiometer R317, connected in series with R316 as a voltage divider between ground and the negative bus. That setting is preferably such that, as the grid of tube V56 rises during antenna scansion in one direction that tube starts to conduct just after the grid has passed through ground; and as the grid of V56 falls during scansion in the other direction, the tube is cut off just before the grid reaches ground. In either instance, the tube condition then remains substantially unchanged through the remainder of each scansion movement. A step voltage is thereby developed at the plate of V56, the step being positive and lagging zero value of the control voltage at input line 570 for one direction of scansion, and being negative and leading zero control voltage for the other direction of scansion. That step voltage is inverted, amplified and sharpened by V58. The resulting step from the plate of V58 is recentered downward by R306, R307, sharply limited by the diodes V59, V60, and supplied to the grid of tube V61 as a sharp step wave of varying direction. That step extends typically between −10 volts and ground potential and occurs at a time that just follows and just preceds substantial equality of the antenna and aircraft angles for positive and negative going waves, respectively.

Channel II, as shown, is closely similar to channel I, and operates on the same principles. However, in channel II provision is shown for independently adjusting the cathode level of first stage tube V66 during azimuth and elevation scansion. Such dual adjustability may be provided also in channel I, or may be provided in channel I and not in channel II. The grid of compensator tube V67 in channel II is connected selectively via the double throw switch 576 to the respective movable contacts of two parallel connected potentiometers R308 and R309, which with R310 comprise voltage dividers between ground and the negative bus. A relatively high resistor R332 to ground stabilizes the grid during switch operation. Switch 576 is operated in synchronism with switches 69, 71 and 187, as indicated by the broken line 67. Thus, the normal level of the cathode of V66 is determined via compensator tube V67 by the setting of the potentiometer R308 during scansion in azimuth, say, and by that of potentiometer R309 during scansion in elevation. Each of those settings is preferably such as to cause conduction in tube V66 to start shortly before the potential of input line 570 reaches zero in a positive direction, and to cut off the tube just after the grid has passed through zero in a negative direction. A step voltage is thereby supplied by channel II to the grid of differential amplifier tube V71 in a manner already described in connection with channel I and tube V61, shifting that grid abruptly between about −10 volts and ground potential. The steps applied in any one scansion movement to the grids of V61 and V71 are always in the same sense. When the steps are positive, the grid of V71 is raised first; when they are negative, the grid of V61 is lowered first.

Tubes V61 and V71, comprising a differential amplifier, share cathode resistor R324. At the start of each scansion cycle both grids are at substantially equal potentials, typically approximately ground potential, as set by limiters V60 and V70, respectively, when scansion is in one direction; and approximately −10 volts, as set by limiters V59 and V69, respectively, and voltage dividers R321, R334, when scansion is in the other direction. In either instance, the tubes share approximately equally the current through common cathode resistor R324. (The relatively small effect of resistor R323 will be described presently.) The voltage drop in plate resistor R322 of tube V61 holds the plate of that tube approximately midway of its total operating range. When the step waves are positive, the wave from channel II first lifts the grid of V71 by approximately 10 volts, increasing conduction through V71 and substantially cutting off V61. The step wave from channel I, which follows that of channel II by a few milliseconds, then raises the grid of V61 to substantially the same potential already attained by the grid of V71, restoring substantial equality of the currents in the two tubes. A positive going square wave is thus developed at the plate of V61, with peak close to the positive supply voltage and substantially coinciding in time with zero voltage at input 570. The duration of that square wave is adjustable at R317 for both azimuth and elevation scansion, and at R308 and R309 for those respective types of scansion separately.

In the case of negative going step waves, with both differential amplifier grids initially near ground, the step from channel I first cuts off V61, raising its plate substantially to the supply potential; and the slightly later step from channel II then lowers the grid of V71 to reestablish substantial equality of the tube currents. The square wave developed at the plate of V61 has substantially the same form as before, but with its leading and trailing edges controlled by channels I and II, respectively, instead of the other way around.

The amplitude of the square wave at the plate of V61 can be considerably increased by providing a relatively small resistor R323 between the cathode of V71 and common cathode resistor R324. The peak of the square wave is not appreciably affected, since the difference of about 10 volts between the two grids then greatly exceeds the voltage drop in R323. But the base voltage of the square wave is lowered, since when the two grids are equal R323 provides additional negative bias to V71, causing V61 to draw more than half of the total current.

The positive going gate from the plate of V61 is recentered downward by R325 and R326, and its peak is limited to a level typically about −15 volts by diode-connected tube V62. The resulting gate is then delivered to line 188 via cathode follower V63 as a positive going angle gate with base voltage typically about −60 volts and peak voltage about −15 volts.

A connection is shown in Fig. 12 by which a strongly negative blanking voltage may be applied from line 213 to the grid of cathode follower V63. Such a blanking voltage may be supplied, for example, by cam operated switch 496 of Fig. 5, which remains open within an azimuth sector that includes the entire range in azimuth of the precision display, and is closed to a negative blanking voltage at azimuth angles outside of that sector. Application of such a blanking voltage via line 213 to the grid of V63 holds the grid below its normal base voltage and prevents transmission of the angle gate from the plate of V61 to output line 188. In absence of any angle gate, no precision video signal can be generated by the blocking oscillator, shown as a typical video generator in Fig. 11. Hence, no representation of the artificial aircraft can then appear in the precision displays.

Figure 13:
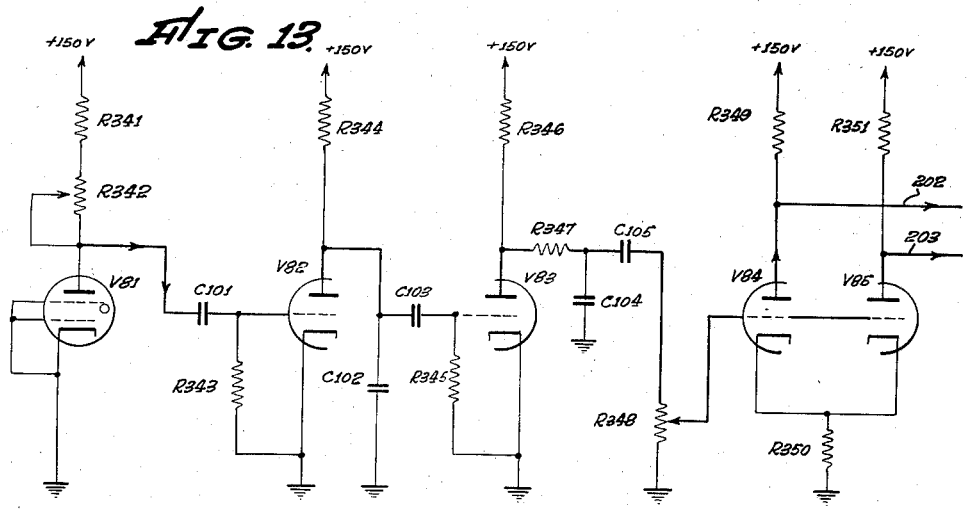
Fig. 13 is a schematic diagram representing illustrative means for generating a low frequency noise signal, for use in modulating the video signal in accordance with the present invention.

Fig. 13 represents in schematic form illustrative means for generating a low-frequency noise signal, as indicated in block form at 200 in Fig. 1, for supply to the respective search and precision video generators 160 and 190. Tube V81 is a gas tube, shown as a tetrode with both grids tied to the cathode, and is connected as a relaxation oscillator with capacity provided entirely by the internal capacitance of the tube. The plate load, which consists of series connected R341 and variable R342, is preferably sufficiently small that the operating frequency, typically about 200 kilocycles per second, is determined primarily by the ignition time and the extinction time of gas in the tube, rather than by constants of the external circuit. The output, as taken from the plate of V81 via coupling capacitor C101, then consists of a voltage wave of relatively small average amplitude. However, that amplitude is particularly variable from one cycle to another in response, presumably, to random fluctuations in the internal condition of the tube which affect the ignition and extinction times. As the plate voltage increases, for example, during a period of nonconduction through the tube, any delay in firing of the tube, such as may be caused by unusually low stray ionization in the tube, permits the plate voltage to rise to a higher than normal value. Such delay therefore causes during that particular cycle of oscillation a dual effect of abnormally long period of operation and abnormally high amplitude of output signal. Similarly, if the tube happens to remain conductive to an unusually low plate voltage, both the period of oscillation and the amplitude of oscillation are abnormally great during that particular cycle. The output wave at the plate of tube V81 therefore contains random variations of frequency accompanied by corresponding variations of amplitude, and the present oscillator V81 may be considered as illustrative of any means for generating a wave that is appreciably modulated in a substantially random manner.

The output from oscillator tube V81 is, in effect, demodulated, removing the fundamental frequency of the oscillator, and the modulation frequencies are amplified and filtered to produce a low frequency noise signal of the desired amplitude, frequency region and bandwidth. In the preferred system illustrated, the randomly modulated signal from tube V81 is amplified successively by V82 and V83, the output from each stage of amplification being passed through a low-pass filter that sharply attenuates the signal at frequencies near or higher than the average fundamental frequency of the oscillator. As shown, the attenuating network for the output from V82 comprises the shunt capacitor C102 to ground; and that for the output from V83 is a half T section comprising series resistor R347 and shunting capacitor C104. The attenuation of each such filter at the fundamental frequency is considerably greater than the amplification of the signal by the preceding amplifying stage, so that the resulting amplitude of the fundamental decreases progressively through the amplifier substantially to zero. The degree of attenuation in each filter network decreases with decreasing frequency, typically at a substantially uniform rate such as 6 decibels per octave. Hence at some determinable frequency less than the fundamental, the overall attenuation is less than the amplification, and at progressively lower frequencies the overall effect of the system is a progressively higher degree of amplification. The final output of the combined amplifying and attenuating network corresponds substantially to the envelope of the oscillation peaks of the original signal, or, more exactly, to the lower frequency portion of that envelope. It is not required, and ordinarily is not desirable, to use filter networks that selectively attenuate only the fundamental frequency, both because the oscillator output includes a relatively high harmonic content which needs to be removed, and because it is usually desirable to remove, or at least to attenuate, the higher frequency components of the envelope of the amplitude variations. A system of the type described produces a final signal that comprises primarily a band of relatively low frequencies, including in particular frequencies between one and approximately ten cycles per second, the actual amplitude at each frequency varying in a substantially random manner.

That low frequency noise signal is supplied via coupling capacitor C105 and conventional volume control potentiometer R348 to the grids of twin amplifying tubes V84 and V85, which provide mutually isolated but identical outputs of effective amplitude on lines 202 and 203 for the precision and search systems, respectively. Those noise signals are utilized to modulate the respective video signals as already typically described in connection with Fig. 11.

Figure 14:
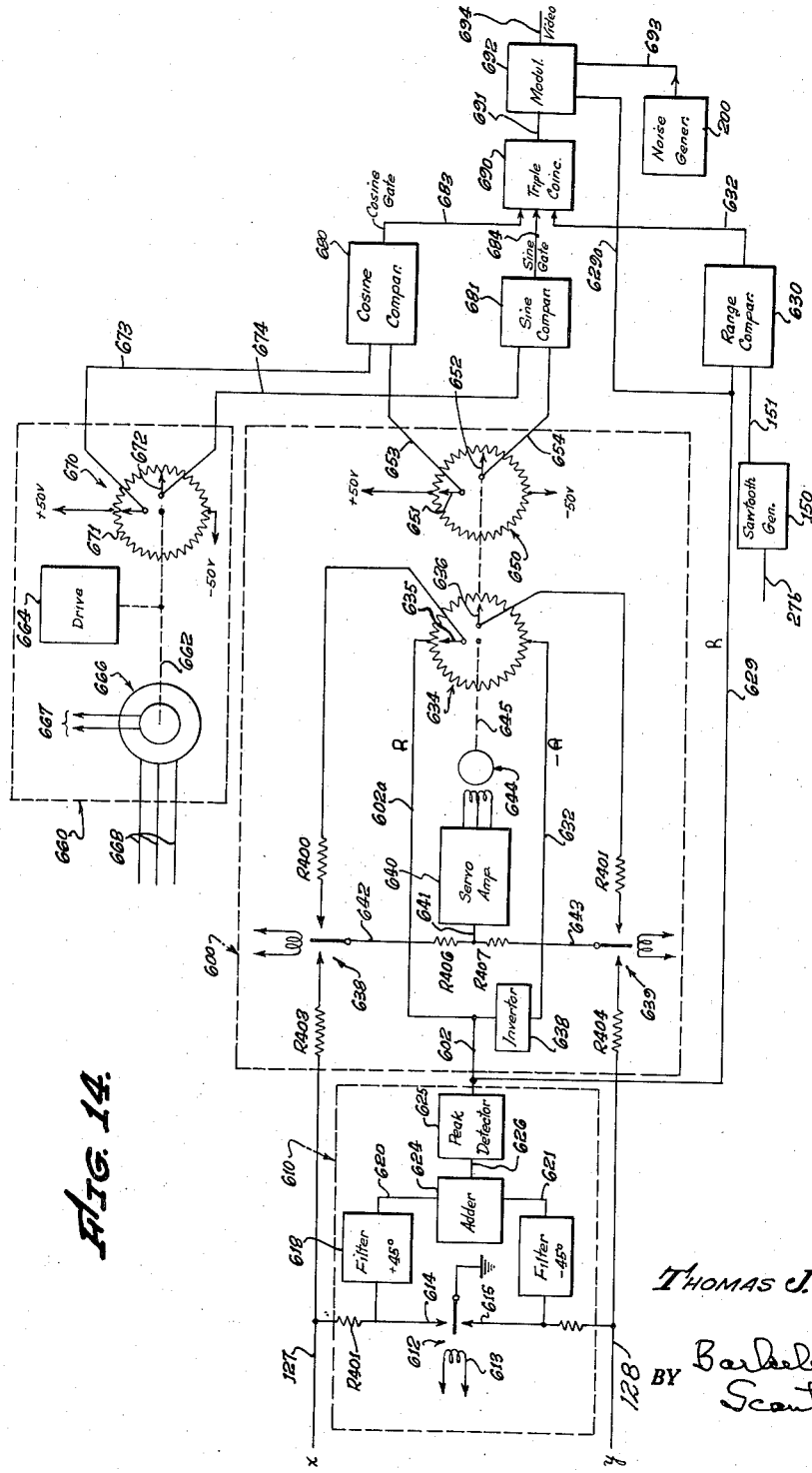
Fig. 14 is a schematic diagram representing an illustrative modification of a portion of the search system.

Fig. 14 illustrates a modification in which the search video signal is developed in response to triple coincidence of three gates, one of which corresponds to range and the other two of which correspond to different functions of the azimuth scan angle. The figure further illustrates the development of scansion data from an antenna scan simulator, and the use of one type of such data to control the cathode ray tube indicator and of another type of data to control development of the artificial aircraft video signal. In Fig. 14 an $x$ position signal is supplied over line 127, a $y$ position signal over line 128, and a sawtooth wave in time relation to trigger pulses of the search system over line 151, any suitable means being employed for developing those signals, for example the means already illustratively described and shown.

A range signal is developed from the two cartesian position signals on lines 127 and 128, and is supplied via line 602 to an angle function computer shown illustratively at 600. Derivation of that range signal may be made in any convenient manner, including that shown at 140 in Fig. 3. An alternative method of range signal derivation is shown at 610 in Fig. 14, and has the advantage of requiring no servo mechanism. Quadrature voltages are developed having amplitudes proportional to the $x$ and $y$ position signals, respectively. As shown, the double pole chopper switch 612, driven at any convenient frequency $w$, for example by the coil 613 supplied with suitable alternating current, has its armature grounded and its two switch contacts 614 and 615 connected through equal resistances R401 and R402 to lines 127 and 128, respectively. The voltages developed at the switch contacts are substantially square waves 180° out of phase and having amplitudes proportional to the existing $x$ and $y$ position signals, respectively. Those voltages are passed through suitable filter networks of known type, indicated schematically at 618 and 619, respectively, to remove harmonics of the fundamental frequency, developing on lines 620 and 621 sinusoidal waves with respective amplitudes proportional to the $x$ and $y$ posittion signals. Filters 618 and 619 also include means for shifting the phases of the respective signals in such a way that the phase difference between the sinusoidal waves on lines 620 and 621 is 90°. For example, filter 618 may advance the phase 45° and filter 619 may retard the phase 45°. The signals thus developed on lines 620 and 621 are added, as by conventional means indicated at 624, producing on line 626 a signal proportional to $x \sin wt + y \cos wt$. That signal is peak detected at 625 to produce on line 602 a direct current voltage proportional to the peak amplitude of the signal received from line 626. That voltage is proportional to the square root of $x^2+y^2$; and represents the aircraft range R that corresponds to the cartesian coordinates $x$ and $y$.

The range signal on line 602 is supplied via line 629 to a range comparator circuit, indicated schematically at 630. That circuit is also supplied with a sawtooth wave, for example via line 151 from sawtooth generator 150 already described, which has a definite time relation to the system trigger. Circuit 630, which may be substantially like that of Fig. 10, develops on line 632 a range gate in response to a definite relation, typically equality, between the range signal and the voltage of the sawtooth wave. A range gate is thus developed during each sweep of the cathode ray beam at that point of the sweep that corresponds to the range represented by the range signal at 602.

The range signal on line 602 is inverted by means shown schematically at 638, which may be of the type shown in Fig. 7. The range signal and the inverted range signal are supplied via lines 602a and 632 to the positive and negative terminals, respectively, of the sine potentiometer 634. The voltages developed at the cosine and sine brushes 635 and 636 of potentiometer 634, are proportional, respectively, to $R \cos v$ and $R \sin v$ where $v$ is the angle of potentiometer 634. Those voltages are supplied, respectively, via the resistors R400 and R401 to the synchronously driven chopper switches 638 and 639, by which they are compared with respective $x$ and $y$ position voltages derived via R403 and R404 from lines 127 and 128. The resulting difference voltages on lines 642 and 643 are added by the resistances R406 and R407, and their sum is supplied via line 641 as error signal to a servo amplifier 640. That amplifier controls the servo motor 644, which drives potentiometer 634 via a shaft shown schematically at 645, to maintain both error signals substantially equal to zero. The rotational angle $v$ of shaft 645 and of potentiometer 634 then satisfies the equations $$R \cos v = x$$
$$R \sin v = y$$

Angle $v$ is therefore the azimuth angle $\theta$ corresponding to cartesian coordinates $x$ and $y$.

A second sine potentiometer 650 is driven in tandem with 634 and is supplied with constant equal positive and negative voltages, shown illustratively as +50 volts and −50 volts. The voltage signal on line 653 tapped from potentiometer 650 by cosine brush 651 then represents cos $\theta$, and the voltage signal on line 654 tapped by sine brush 652 represents sin $\theta$.

When the aircraft simulator is utilized in conjunction with a radar system of the type that provides angle data for its search antenna in the form of voltages proportional to the cosine and the sine of the scan angle, such antenna data may be compared directly with the angle signals on lines 653 and 654, respectively. It may, however, be convenient to make the aircraft simulator functionally independent of any actual antenna of a radar system. It is then not necessary to drive the radar antenna when the aircraft simulator is operated. Indeed, the simulator may be used in connection with a display system that is not actually a part of a radar system. The term "radar display system" is used herein with reference to a display system of radar type, regardless of whether it is associated with a radar system. Such a radar display system may be provided, together with the antenna scan simulator to be described, as part of an aircraft simulator system, which may then operate independently of any actual radar system.

An illustrative antenna scan simulator is shown schematically at 660 in Fig. 14. A shaft 662 is driven by any suitable drive means 664, such as an electric motor, at a rate preferably corresponding to the scansion movement of a normal radar antenna. Scansion angle data for the display system are developed from the rotation of shaft 662. If the radar display system includes a plan position indicator and accompanying trigger and sweep circuitry of the illustrative type indicated schematically in Fig. 1 at 26, 21 and 33, the scansion angle data may be developed by a synchro generator 666, provided with alternating current at 667 and driven with shaft 662 as indicated in Fig. 14, and may be supplied via lines 668, which correspond to line 35 of Fig. 1, to drive means 34 of the tube deflection yoke 32. The scan angle of a sweep path 37 on the screen of display tube 26 is thereby caused to correspond to the rotational angle of shaft 662 of the antenna scan simulator.

The angle data on lines 668 may also be utilized for angle control of the aircraft simulator, for example in the manner already described in connection with angle comparison means 146 of Figs. 1 and 3. In the present embodiment, however, angle data of a different and specialized type are developed from shaft 662 for angle control of the aircraft simulator. As illustratively shown, a sine potentiometer 670 is driven in suitable phase relation with shaft 662 and is supplied with constant positive and negative direct current voltages, typically equal to those supplied to sine potentiometer 650, already described. The respective outputs from the cosine and sine brushes 671 and 672 on lines 673 and 674 then represent the cosine and sine, respectively, of the scan angle of the cathode ray sweep path of the indicator display.

Those angle function voltages may be compared directly with the aircraft azimuth function voltages on lines 653 and 654, as by respective cosine and sine comparison circuits indicated schematically at 680 and 681. Those circuits, which may be of conventional type, develop on lines 683 and 684, respectively, cosine and sine gates only in response to substantial equality of the respective scan angle voltages and aircraft angle function voltages supplied to the comparison circuits. Coincidence of a cosine gate and a sine gate occurs whenever the indicator scan angle, as represented by the angle function data on lines 673 and 674, is substantially equal to the aircraft azimuth angle, as represented by the azimuth angle function signals on lines 653 and 654.

The range gate on line 632, the cosine gate on line 683 and the sine gate on line 684 are all supplied to circuitry shown schematically at 690 which is responsive to the triple coincidence of gates of those three types, and which produces a pulse on line 691 only when such triple coincidence occurs. Triple coincidence circuit may, for example, be similar in structure to the video generating blocking oscillator circuit of Fig. 11, with the range gate from line 694 taking the place of line 154 of that figure, one of the azimuth angle function signals from lines 683 and 684 being supplied in place of the search angle gate on line 147 of that figure, and the other supplied to the grid of tube V50 in place of the range modulating signal on line 143a, the component values of the circuit being so adjusted that tube V51 conducts only in response to triple coincidence of three gates, and then produces a sharp video pulse. That pulse is preferably amplitude modulated by modulator 692 in inverse relation to the aircraft range as represented by the range signal supplied from line 602 via line 629a; and is also preferably modulated in accordance with a low frequency noise signal supplied, for example, via line 693 from noise generator 200, already described. The output from modulator 692 on line 694 is then a video signal corresponding to the signal on line 162 of Fig. 1 and is suitable for supply to the radar display system to modulate the intensity of the cathode ray beam at the moment when its position on the tube screen corresponds in azimuth and range to the position of the artificial aircraft.

Fig. 15 corresponds to Fig. 14 and illustrates a further modification. The $x$ and $y$ cartesian position signals from lines 127 and 128 are supplied directly to the respective comparison circuits 680a and 681a without derivation of any explicit representation of the aircraft azimuth angle. Scan simulator 600a, as illustratively shown, is like scan simulator 600 of Fig. 14 except that its sine potentiometer 670a is supplied with positive and negative voltages representing the range of the artificial aircraft, rather than with fixed voltages. Those range representing voltages may be derived by a range signal generator 610 and inverter 638 as already described for supply of voltages to potentiometer 634 of Fig. 14. The respective outputs on lines 673a and 674a from cosine brush 671a and from sine brush 672a of potentiometer 670a are then voltages proportional to the $x$ and $y$ cartesian coordinates of the point on the sweep path of the cathode ray beam at a distance along the sweep that corresponds to the range of the artificial aircraft. Those $x$ and $y$ coordinates vary sinusoidally with the scan angle. At the scan angle that corresponds to the azimuth angle of the artificial aircraft the voltage on line 673a equals the $x$ position signal on line 127 and the voltage on line 674a simultaneously equals the $y$ position signal on line 128. Under those conditions comparison circuits 680a and 681a produce simultaneously an $x$ gate on line 683 and a $y$ gate on line 684. Those gates are supplied, together with the range gate from range comparison circuit 692, to triple coincidence circuit 690, and the video signal is generated as already described for Fig. 14.

I claim:

1. An aircraft signal simulator for use with a radar display system of the type that produces a cathode ray tube display of the positions of targets with respect to a predetermined zero, said aircraft signal simulator comprising control means for developing a plurality of velocity signals that represent respective coordinates of the velocity of an artificial aircraft, respective integrating means for the velocity signals, each integrating means being capable of respective normal and accelerated conditions in which it acts to produce, respectively, a normal output signal that is proportional to the time integral of the velocity signal at a normal constant of proportionality, and an accelerated output signal that is proportional to the time integral of the velocity signal at a relatively large constant of proportionality, means for shifting the several integrating means simultaneously between corresponding respective conditions, and means acting to produce on the cathode ray tube screen visual indications corresponding to the output signals of the integrating means.

2. An aircraft signal simulator for use with a radar display system of the type that produces a cathode ray tube display of the positions of targets with respect to a predetermined zero, said aircraft signal simulator comprising control means for developing a plurality of cartesian velocity signals that represent respective cartesian coordinates of the velocity of an artificial aircraft, respective integrating means for the velocity signals, each integrating means being capable of respective normal and accelerated conditions in which it acts to produce, respectively, a normal output signal that is proportional to the time integral of the velocity signal at a normal constant of proportionality, and an accelerated output signal that is proportional to the time integral of the velocity signal at a relatively large constant of proportionality, the normal and the relatively large constants of proportionality having the same respective values for all said integrating means, means for shifting the several integrating means simultaneously between corresponding respective conditions, resolving means acting under joint control of the output signals of the integrating means to develop two polar position signals that represent, respectively, the position angle and range corresponding to said output signals, and means acting under joint control of the two polar position signals to produce on the cathode ray tube screen visual indication of said position angle and range.

3. An aircraft signal simulator for use with a radar display system of the type that produces a cathode ray tube display of the positions of targets with respect to a predetermined zero, said aircraft signal simulator comprising control means for developing a plurality of cartesian velocity signals that represent respective cartesian coordinates of the velocity of an artificial aircraft, respective integrating means for the velocity signals acting to produce respective position signals that represent corresponding cartesian coordinates of the position of the artificial aircraft, each integrating means comprising an amplifier, input means for supplying the velocity signal to the amplifier through a series resistance, and capacitance means connected between the amplifier output and input, switching means for each integrating means capable of two conditions in which the product of the resistance and the capacitance has a normal and a relatively small value, respectively, means for shifting the several switching means simultaneously between their corresponding respective conditions, and means acting to produce on the cathode ray tube screen visual indications corresponding to the output signals of the integrating means.

4. An aircraft signal simulator for use with a radar display system of the type that produces a cathode ray tube display of two polar position coordinates of targets with respect to a predetermined zero, said aircraft signal simulator comprising control means for developing a speed signal and a rate-of-turn signal that represent, respectively, the speed and rate-of-turn of an artificial aircraft, said signals being variable through respective ranges that correspond to actual aircraft flight conditions, resolving means responsive to the flight signals and acting to develop two cartesian velocity signals that represent, respectively, two cartesian coordinates of the velocity of the aircraft, respective integrating means for the velocity signals, acting to develop two cartesian position signals that are proportional to time integrals of the respective velocity signals, the integrating means being capable of respective normal and accelerated conditions and acting when in normal condition to integrate at a normal time rate and acting when in accelerated condition to integrate at an accelerated time rate, the normal time rate producing cartesian position signals that correspond to the aircraft speed represented by said speed signal, and the accelerated time rate producing position signals that correspond to an aircraft speed that is appreciably greater by a definite predetermined factor than the speed represented by said speed signal, means for shifting the two integrating means simultaneously between their normal and their accelerated conditions, second resolving means acting under joint control of the cartesian position signals to develop two corresponding polar position signals that represent, respectively, the values of the said polar position coordinates that correspond to the cartesian position signals, and means acting under joint control of the two polar position signals to modulate the intensity of the cathode ray beam and thereby to indicate on the tube screen the position represented by those signals.

5. An aircraft signal simulator for use with a radar display system of the type that produces a cathode ray tube display of the positions of targets with respect to a predetermined zero, said aircraft signal simulator comprising control means for developing a plurality of cartesian velocity signals that represent respective cartesian components of the velocity of an artificial aircraft, respective integrating means for the velocity signals, each integrating means being capable of respective arresting, normal and accelerated conditions in which it acts to produce, respectively, an arresting output signal that is substantially constant, a normal output signal that is proportional to the time integral of the velocity signal at a normal constant of proportionality, and an accelerated output signal that is proportional to the time integral of the velocity signal with a relatively large proportionality constant, means for shifting the integrating means simultaneously between corresponding respective conditions, and means acting to produce on the cathode ray tube screen visual indications corresponding to the output signals of the integrating means.

6. An aircraft signal simulator for use with a radar display system of the type that produces a cathode ray tube display of the positions of targets with respect to a predetermined zero, said aircraft signal simulator comprising control means for developing a speed signal and a rate-of-turn signal that represent, respectively, the speed and rate-of-turn of an artificial aircraft, a heading shaft, driving means acting to drive the heading shaft in response to the rate-of-turn signal, resolving means acting under control of the heading shaft and the speed signal to develop two cartesian velocity signals that represent, respectively, two cartesian components of the velocity of the aircraft, respective integrating means for the velocity signals acting to develop two cartesian position signals that are proportional to time integrals of the respective velocity signals, means acting to produce on the cathode ray tube display visual indications corresponding to said position signals, and means for arresting the apparent movement of the artificial aircraft, said arresting means comprising speed arresting means actuable to supply to the respective integrating means signals that represent zero velocity components, turn arresting means actuable to supply to said driving means a signal that represents zero rate-of-turn, and means operable independently of the said control means to actuate simultaneously the speed arresting means and the turn arresting means.

7. An aircraft signal simulator for use with a radar display system of the type that produces a cathode ray tube display of the positions of targets with respect to a predetermined zero, said aircraft signal simulator comprising control means for developing a speed signal and a rate-of-turn signal that represent, respectively, the speed and rate-of-turn of an artificial aircraft, a heading shaft, driving means acting to drive the heading shaft in response to the rate-of-turn signal, resolving means acting under control of the heading shaft and the speed signal to develop two cartesian velocity signals that represent, respectively, two cartesian components of the velocity of the aircraft, respective integrating means for the velocity signals, each integrating means being capable of respective arresting and normal conditions in which it acts to produce, respectively, an arresting output signal that is substantially constant and a normal output signal that is proportional to the time integral of the corresponding velocity signal, switching means for shifting the integrating means simultaneously between arresting and normal conditions, said switching means including means acting to disable the said driving means when the integrating means are in their said arresting conditions, and means acting to produce on the cathode ray tube screen visual indications corresponding to the output signals of the integrating means.

8. An aircraft signal simulator for use with a radar display system of the type that produces a cathode ray tube display of the position angle and range of radar targets with respect to a predetermined zero, said aircraft signal simulator comprising means for developing two cartesian position signals that represent, respectively, two cartesian coordinates of the position of an artificial aircraft, resolving means responsive to the cartesian position signals and including a rotatable aircraft bearing shaft, servo means for driving the shaft in response to an error signal to maintain the shaft angle equal to the azimuth angle corresponding to the cartesian position signals, means acting to develop a range signal that represents the range corresponding to the cartesian position signals, and means acting under control of the range signal to alternate the error signal when the magnitude of the range represented by the range signal is less than a predetermined critical value.

9. An aircraft signal simulator for use with a radar display system of the type that produces a cathode ray tube display of the position angle and range of radar targets with respect to a predetermined zero, said aircraft signal simulator comprising means for developing two cartesian position signals that represent, respectively, two cartesian coordinates of the position of an artificial aircraft, resolving means including a servo system responsive to the cartesian position signals and acting to develop an angle signal and a range signal that represent, respectively, the azimuth angle and the range of the artificial aircraft, said servo system being shiftable between first and second conditions in which it responds relatively sensitively and relatively insensitively, respectively, to changes in the cartesian position signals, and means acting under control of the range signal to shift the servo system to its first condition when the range is less than a predetermined critical value and to shift the servo system to its second condition when the range is greater than that value.

10. An aircraft signal simulator for use with a radar display system of the type that produces a cathode ray tube display of the position angle and range of radar targets with respect to a predetermined zero, said aircraft signal simulator comprising means for developing two cartesian position signals that represent, respectively, two cartesian coordinates of the position of an artificial aircraft, resolving means including a servo system responsive to the cartesian position signals and acting to develop an angle signal and a range signal that represent, respectively, the azimuth angle and the range of the artificial aircraft, said servo system being shiftable between first and second conditions in which it responds relatively sensitively and relatively insensitively, respectively, to changes in the cartesian position signals, range indicating means acting under control of the range signal and independently of the radar display system to indicate the value of the range represented by the range signal, said range indicating means being shiftable between relatively sensitive and relatively insensitive conditions, and means acting under control of the range signal to shift the servo system and the range indicating means simultaneously between their respective relatively sensitive and relatively insensitive conditions.

11. An aircraft signal simulator for use with a radar display system of the type that produces a cathode ray tube expanded angular display of position angle and range of radar targets with respect to a predetermined zero, said aircraft signal simulator comprising means for developing two cartesian position signals that represent, respectively, two cartesian coordinates of the position of an artificial aircraft, one of the said coordinates being measured from the said zero in a direction within the angular field of the said display, two potentiometers, means acting to supply one of the potentiometers with a voltage proportional to the cartesian position signal for the said one cartesian coordinate, and to supply the other potentiometer with a fixed voltage, servo means acting to drive the potentiometers in tandem to maintain the voltage tapped from the said one potentiometer proportional to the cartesian position signal for the other cartesian coordinate, and means acting to modulate the intensity of the cathode ray beam at an angle corresponding to the voltage tapped from the said other potentiometer.

12. An aircraft signal simulator for use with a radar display system of the type that produces a cathode ray tube plan position display of the azimuth position angle and range of radar targets with respect to a predetermined zero, said aircraft signal simulator comprising means for developing two cartesian position signals that represent, respectively, two cartesian coordinates of the position of an artificial aircraft, means acting under joint control of the cartesian position signals to develop a range signal that represents the range of the aircraft from the said zero, means acting under joint control of the cartesian position signals and the range signal to develop two angle signals which are proportional, respectively, to the sine and the cosine of the position angle of the aircraft, first gating means acting under control of the respective angle signals to develop respective angle gate pulses when those signals correspond to the instant values of the sine and cosine, respectively, of the direction of sweep of the cathode ray beam, second gating means acting under control of the range signal to develop a range gate pulse when that signal corresponds to the position of the cathode ray beam along its sweep, and means acting to modulate the intensity of the cathode ray beam only in response to triple coincidence of the said angle gate pulses and the range gate pulse.

13. Resolving means responsive to two cartesian voltage signals that represent respective cartesian coordinates of a vector quantity, said resolving means comprising means acting to produce a range voltage signal that represents the corresponding radial coordinate, a sine potentiometer having positive and negative coil terminals and having sine and cosine brushes, means for supplying the range signal to one terminal and for supplying the range signal with inverted polarity to the other terminal of the sine potentiometer, servo means acting to drive the sine potentiometer to maintain the voltage at the sine brush equal to one cartesian voltage signal and to maintain the voltage at the cosine brush equal to the other cartesian voltage signal, whereby the angle of the sine potentiometer represents the polar angle corresponding to the cartesian voltage signals.

14. An aircraft signal simulator for use with a radar display system of the type that produces a cathode ray tube plan position display of the azimuth and range of radar targets with respect to a predetermined zero, said aircraft signal simulator comprising means for developing two cartesian position signals that represent, respectively, two cartesian coordinates of the position of an artificial aircraft with respect to the said zero, a rotatable aircraft bearing shaft, shaft driving means acting under joint control of the cartesian position signals to position the shaft at an angle that represents the azimuth position angle of the aircraft with respect to the said zero, a scansion angle shaft driven in phase with the angle of sweep of the cathode ray beam, differential means acting to develop a signal representing the angle between the aircraft bearing shaft and the scansion angle shaft, first gating means responsive to the last said signal and acting to develop an angle gate pulse in response to a predetermined value thereof, second gating means acting to develop a range gate pulse when the position of the cathode ray beam along its sweep corresponds to the range of the artificial aircraft from the said zero, and means acting to modulate the intensity of the cathode ray beam in response to coincidence of a range gate pulse and an angle gate pulse.

15. An aircraft signal simulator for use with a radar system of the type that includes a search radar antenna driven periodically in scansion, means driven with the antenna and acting to develop an angle signal of relatively low frequency synchro type, cathode ray tube means for producing a plan position display of the position angle and range of radar targets, the direction of beam scansion in the cathode ray tube being responsive to the said angle signal; said aircraft signal simulator comprising an aircraft bearing shaft, control means acting to drive the bearing shaft to maintain the shaft angle equal to the bearing angle of an artificial aircraft, an antenna follow-up shaft, means acting under control of the relatively low frequency synchro angle signal to drive the antenna follow-up shaft to maintain its shaft angle equal to the scansion angle of the antenna, three phase synchro means including a source of alternating current power of relatively high frequency, a synchro generator and a differential generator, one of said generators being driven with the antenna follow-up shaft and the other being driven with the aircraft bearing shaft, comparison means responsive to the relatively high frequency output of the synchro means and acting to produce an angle gate pulse in response to equality of the two shaft angles, and means acting in response to the angle gate pulse to modulate the intensity of the cathode ray beam.

16. An aircraft signal simulator comprising a rotatable aircraft bearing shaft, means for driving the shaft to represent the azimuth angle of an artificial aircraft, a cathode ray tube and means for producing a display of plan position type on the tube screen, a scansion angle shaft driven in phase with the sweep of the cathode ray beam, three phase synchro means including a synchro generator and a differential generator, one of said generators being driven with the bearing shaft and the other generator being driven with the scansion angle shaft, said synchro means acting to produce a first alternating current signal substantially proportional to the differential angle between the said shafts and a second alternating current signal substantially proportional to the sine of an angle that is 120 degrees out of phase with said differential angle, comparison means responsive to said signals and acting to develop an angle gate pulse in response to zero value of said differential angle, and means acting in response to the angle gate pulse to modulate the intensity of the cathode ray beam.

17. Resolving means responsive to a predetermined angular relation between two shafts, said resolving means comprising a synchro generator and a differential generator of three phase type driven with the respective shafts and acting to produce first and second alternating current signals substantially proportional to respective angles that are 120° out of phase, the first of said angles being zero when the shafts have the said angular relation, comparison means responsive to the first signal and acting to produce a pulse in response to zero value thereof, and discriminating means responsive to said pulses and to the second signal and acting to accept those pulses for which the first said angle is zero and to reject those pulses for which the first said angle is 180 degrees, and output means responsive to the accepted pulses.

18. An aircraft signal simulator for use with a radar system of the type that includes a search radar antenna driven periodically in scansion, means driven with the antenna and acting to develop an angle signal of relatively low frequency synchro type, cathode ray tube means for producing a plan position display of the position angle and range of radar targets, the direction of beam scansion in the cathode ray tube being responsive to the said angle signal; said aircraft signal simulator comprising an aircraft bearing shaft, control means acting to drive the bearing shaft to maintain the shaft angle equal to the bearing angle of an artificial aircraft, an antenna follow-up shaft, means acting under control of the relatively low frequency synchro angle signal to drive the antenna follow-up shaft to maintain its shaft angle equal to the scansion angle of the antenna, three phase synchro means including a source of alternating current power of relatively high frequency, a synchro generator and a differential generator, one of said generators being driven with the antenna follow-up shaft and the other being driven with the aircraft bearing shaft, one phase of the output of the synchro means having a null of one type when the shaft angles are equal and having a null of a second type when the shaft angles differ by 180°, null detecting means acting under control of the said one phase of the synchro output to develop null signals in response to nulls of both types, and null discriminating means acting under control of another phase of the synchro output to distinguish between null signals of the two types and to develop an angle gate in response only to a signal corresponding to a null of the said one type, and means acting in response to the angle gate to modulate the intensity of the cathode ray beam.

19. An aircraft signal simulator for use with a radar system of the type that produces a cathode ray tube display of the position angle of radar targets with respect to a predetermined zero, said radar system being of the type that includes means for producing a directed radar beam, means for causing the beam to move in scansion alternately in one direction and the other in an angular scansion coordinate, and means acting to produce a beam angle signal that represents the instant position of the beam in the scansion coordinate; said aircraft signal simulator comprising control means for developing an aircraft angle signal that represents the position angle of an artificial aircraft in the said scansion coordinate, angle comparison means comprising two comparison channels, each comparison channel being responsive jointly to the beam angle signal and the aircraft angle signal and acting to develop a step voltage in response to a predetermined relation between those two signals, that relation being different for the two channels, whereby the step voltage of one channel alternately precedes and follows the step voltage of the other channel in accordance with the alternating direction of beam scansion, the step voltages of each channel having one polarity in response to beam scansion in one direction and having the other polarity in response to beam scansion in the other direction, and means responsive to the step voltages from the two channels and acting to develop a voltage gate of predetermined polarity, the leading edge of the gate coinciding with the first occurring step voltage and the trailing edge of the gate coinciding with the second occurring step voltage, and means acting to modulate the intensity of the cathode ray beam under control of the voltage gate.

20. An aircraft signal simulator for use with a radar display system of the type that produces a cathode ray tube display of the position angle and range of radar targets with respect to a predetermined zero, said aircraft signal simulator comprising control means for developing angle and range signals that represent, respectively, the position angle and range of an artificial aircraft with respect to the said zero, means responsive to the angle signal and acting to develop an angle gate when the cathode ray beam corresponds in sweep angle to the position angle represented by the angle signal, means responsive to the range signal and acting to develop a range gate when the cathode ray beam corresponds in position along its sweep to the range represented by the range signal, means acting to develop a video signal in response to coincidence of a range gate and an angle gate, and means acting to modulate the video signal under control of the range signal and in inverse relation to the magnitude of the range represented thereby.

21. An aircraft signal simulator for use with a radar display system of the type that produces a cathode ray tube display of the position angle and range of radar targets with respect to a predetermined zero, said aircraft signal simulator comprising control means for developing angle and range signals that represent, respectively, the position angle and range of an artificial aircraft with respect to the said zero, means responsive to the angle signal and acting to develop an angle gate when the cathode ray beam corresponds in sweep angle to the position angle represented by the angle signal, means responsive to the range signal and acting to develop a range gate when the cathode ray beam corresponds in position along its sweep to the range represented by the range signal, means acting to develop a low frequency noise signal, means acting to develop a video signal in response to coincidence of a range gate and an angle gate, and means acting to modulate the video signal in accordance with the instant magnitude of the noise signal and in inverse relation to the magnitude of the range represented by the range signal.

22. An aircraft signal simulator for use with a radar display system of the type that produces a cathode ray tube display of the position angle and range of radar targets with respect to a predetermined zero, said aircraft signal simulator comprising control means for developing angle and range signals that represent, respectively, the position angle and range of an artificial aircraft with respect to the said zero, means responsive to the angle signal and acting to develop an angle gate when the cathode ray beam corresponds in sweep angle to the position angle represented by the angle signal, means responsive to the range signal and acting to develop a range gate when the cathode ray beam corresponds in position along its sweep to the range represented by the range signal, means acting to develop a video signal in response to coincidence of a range gate and an angle gate, means acting to develop a low frequency noise signal, means acting to modulate the noise signal under control of the range signal and in direct relation to the magnitude of the range represented by the range signal, and means acting to modulate the video signal in response to the modulated noise signal.

23. An aircraft signal simulator for use with a radar display system of the type that produces a cathode ray tube display of the position angle and range of radar targets with respect to a predetermined zero, said aircraft signal simulator comprising control means for developing angle and range signals that represent, respectively, the position angle and range of an artificial aircraft with respect to the said zero, means responsive to the angle signal and acting to develop an angle gate when the cathode ray beam corresponds in sweep angle to the position angle represented by the angle signal, means responsive to the range signal and acting to develop a range gate when the cathode ray beam corresponds in position along its sweep to the range represented by the range signal, means acting to develop a video signal in response to coincidence of a range gate and an angle gate, means acting to develop a low frequency noise signal, means acting to modulate the noise signal under control of the range signal and in direct relation to the magnitude of the range represented by the range signal, and means acting to modulate the video signal in response to the modulated noise signal, and in inverse relation to the magnitude of the range represented by the range signal.

24. An aircraft signal simulator for use with a radar display system of the type that produces a cathode ray tube display of the position angle and range of radar targets with respect to a predetermined zero, said aircraft signal simulator comprising control means for developing angle and range signals that represent, respectively, the position angle and range of an artificial aircraft with respect to the said zero, means responsive to the angle signal and acting to develop an angle gate when the cathode ray beam corresponds in sweep angle to the position angle represented by the angle signal, means responsive to the range signal and acting to develop a range gate when the cathode ray beam corresponds in position along its sweep to the range represented by the range signal, a blocking oscillator circuit comprising a vacuum tube, a resistive plate impedance, a coupling transformer having its primary connected between the tube plate and the plate impedance, and having its secondary connected in series with the tube grid, means normally biasing the tube grid strongly beyond cutoff, means supplying the angle gate to the tube grid to raise that grid nearly to cutoff, a capacitance having one terminal connected to the junction of the transformer primary and the plate impedance, modulating means acting in idle condition of the oscillator and under control of the range signal to vary the potential between the said junction and the tube cathode in inverse relation to the range represented by the range signal, means acting under control of the range gate to produce a current pulse through the transformer primary and thereby to excite the oscillator only in presence of an angle gate, and an output circuit acting to develop a video signal in response to excitation of the oscillator.

25. An aircraft signal simulator for use with a radar display system of the type that produces a cathode ray tube display of the position angle and range of radar targets with respect to a predetermined zero, said aircraft signal simulator comprising control means for developing angle and range signals that represent, respectively, the position angle and range of an artificial aircraft with respect to the said zero, means responsive to the angle signal and acting to develop an angle gate when the cathode ray beam corresponds in sweep angle to the position angle represented by the angle signal, means responsive to the range signal and acting to develop a range gate when the cathode ray beam corresponds in position along its sweep to the range represented by the range signal, means acting to develop a low frequency noise signal, a blocking oscillator circuit comprising a vacuum tube, a resistive impedance, a coupling transformer having its primary connected between the tube plate and the impedance, and having its secondary connected in series with the tube grid, means normally biasing the tube grid strongly beyond cutoff, means supplying the angle gate to the tube grid to raise that grid nearly to cutoff, a capacitance having one terminal connected to the junction of the transformer primary and the impedance, a control tube connected in parallel with the oscillator tube and the transformer primary, the said impedance being in the plate circuits of both tubes, means acting to vary the grid potential of the control tube under control of the range signal and in direct relation to the range represented by that signal, means supplying the noise signal to the junction between the transformer primary and the impedance, means acting under control of the range gate to produce a current pulse through the transformer primary and thereby to excite the oscillator only in presence of an angle gate, and an output circuit acting to develop a video signal in response to excitation of the oscillator.

26. An aircraft signal simulator for use with a radar display system of the type that produces a search cathode ray display of plan position type and produces a precision cathode ray display of partial plan position type, said aircraft signal simulator comprising means for developing two cartesian position signals that represent, respectively, two cartesian coordinates of the position of an artificial aircraft, first computing means acting under joint control of the cartesian position signals to develop a search azimuth signal and a search range signal, first intensifying means acting under joint control of the azimuth and range signals to modulate the intensity of the search cathode ray beam to indicate in the search display the azimuth and range represented by those signals, second computing means normally acting under joint control of the cartesian position signals to develop a precision azimuth signal, second intensifying means normally acting under control of the precision azimuth signal to modulate the intensity of the precision cathode ray beam to indicate in the precision display the azimuth represented by that signal, and disabling means acting under control of the search azimuth signal to disable the second computing means at azimuth angles outside of a predetermined sector that corresponds substantially to the angular range of the precision display.

27. An aircraft signal simulator for use with a radar display system of the type that produces a search cathode ray display of plan position type and produces a precision cathode ray display of partial plan position type, said aircraft signal simulator comprising means for developing two cartesian position signals that represent, respectively, two cartesian coordinates of the position of an artificial aircraft, first computing means acting under joint control of the cartesian position signals to develop a search azimuth signal and a search range signal, first intensifying means acting under joint control of the azimuth and range signals to modulate the intensity of the search cathode ray beam to indicate in the search display the azimuth and range represented by those signals, second computing means normally acting under joint control of the cartesian position signals to develop a precision azimuth signal, second intensifying means normally acting under control of the precision azimuth signal to modulate the intensity of the precision cathode ray beam to indicate in the precision display the azimuth represented by that signal, disabling means acting under control of the search azimuth signal to render ineffective the second intensifying means at azimuth angles outside of a predetermined sector that corresponds substantially to the angular range of the precision display.

28. An aircraft signal simulator for use with a radar display system of the type that produces a search cathode ray display of plan position type and produces a precision cathode ray display of partial plan position type, said aircraft signal simulator comprising means for developing two cartesian position signals that represent, respectively, two cartesian coordinates of the position of an artificial aircraft, first computing means acting under joint control of the cartesian position signals to develop a search azimuth signal and a search range signal, first intensifying means acting under joint control of the azimuth and range signals to modulate the intensity of the search cathode ray beam to indicate in the search display the azimuth and range represented by those signals, second computing means normally acting under joint control of the cartesian position signals to develop a precision azimuth signal, second intensifying means normally acting under control of the precision azimuth signal to modulate the intensity of the precision cathode ray beam to indicate in the precision display the azimuth represented by that signal, and disabling means acting under control of the search range signal to render ineffective the second intensifying means at ranges greater than a predetermined critical range.

29. An aircraft signal simulator for use with a radar display system of the type that produces a search cathode ray display of plan position type and produces a precision cathode ray display of partial plan position type, said aircraft signal simulator comprising means for developing two cartesian position signals that represent, respectively, two cartesian coordinates of the position of an artificial aircraft, first computing means acting under joint control of the cartesian position signals to develop a search azimuth signal and a search range signal, first intensifying means acting under joint control of the azimuth and range signals to modulate the intensity of the search cathode ray beam to indicate in the search display the azimuth and range represented by those signals, second computing means normally acting under joint control of the cartesian position signals to develop a precision azimuth signal, second intensifying means normally acting under control of the precision azimuth signal to modulate the intensity of the precision cathode ray beam to indicate in the precision display the azimuth represented by that signal, first disabling means acting under control of the search azimuth signal to render ineffective the second intensifying means at azimuth angles outside of a first predetermined sector that corresponds substantially to the angular range of the precision display, and second disabling means acting under control of the search azimuth signal to disable the second computing means at azimuth angles outside of a second predetermined sector that includes and exceeds the first said sector.

30. An aircraft signal simulator for use with a radar display system of the type that produces a search cathode ray display of plan position type and produces a precision cathode ray display of partial plan position type, said aircraft signal simulator comprising means for developing two cartesian position signals that represent, respectively, two cartesian coordinates of the position of an artificial aircraft, first computing means including a servo system responsive to the cartesian position signals and acting to develop a search azimuth signal and a search range signal, said servo system being shiftable between first and second conditions in which it responds relatively sensitively and relatively insensitively, respectively, to changes in the cartesian position signals, second computing means normally acting under joint control of the cartesian position signals to develop a precision azimuth signal, and actuating means acting under control of the search range signal to shift the said servo system to its relatively sensitive condition when the range represented by the range signal is less than a predetermined value, and to shift the servo system to its less sensitive condition and simultaneously to disable the second computing means when the range is greater than that value.

References Cited in the file of this patent

UNITED STATES PATENTS

| | | |
|---|---|---|
| 2,471,315 | Dehmel | May 24, 1949 |
| 2,506,998 | Dehmel | May 9, 1950 |
| 2,529,468 | Dehmel | Nov. 7, 1950 |
| 2,555,442 | Hales | June 5, 1951 |
| 2,605,556 | Jones | Aug. 5, 1952 |
| 2,674,812 | Hales | Apr. 13, 1954 |
| 2,677,199 | Droz | May 4, 1954 |
| 2,714,047 | Dehmel | July 26, 1955 |

OTHER REFERENCES

Birtley: "Computer Simulates Moving Radar Targets," Electronics, September 1953, pages 137 to 139.